US012071792B2

United States Patent
Kawanobe et al.

(12) United States Patent
(10) Patent No.: US 12,071,792 B2
(45) Date of Patent: Aug. 27, 2024

(54) DOOR LATCH DEVICE

(71) Applicant: MITSUI KINZOKU ACT CORPORATION, Kanagawa (JP)

(72) Inventors: Osamu Kawanobe, Kanagawa (JP); Shintaro Okawa, Kanagawa (JP); Yasuyuki Watanabe, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 437 days.

(21) Appl. No.: 17/618,813

(22) PCT Filed: Oct. 25, 2019

(86) PCT No.: PCT/JP2019/041980

§ 371 (c)(1),
(2) Date: Dec. 13, 2021

(87) PCT Pub. No.: WO2021/019798

PCT Pub. Date: Feb. 4, 2021

(65) Prior Publication Data

US 2022/0235588 A1 Jul. 28, 2022

(30) Foreign Application Priority Data

Jul. 31, 2019 (JP) ................................. 2019-141668

(51) Int. Cl.
*E05B 81/68* (2014.01)
*E05B 81/06* (2014.01)
(Continued)

(52) U.S. Cl.
CPC .............. *E05B 81/68* (2013.01); *E05B 81/06* (2013.01); *E05B 81/14* (2013.01); *E05B 81/90* (2013.01); *H01H 1/14* (2013.01)

(58) Field of Classification Search
CPC ............ H01H 1/14; H01H 1/58; H01H 13/14; H01H 13/18; H01H 13/503; H01H 13/70;
(Continued)

(56) References Cited

U.S. PATENT DOCUMENTS 6,102,453 A * 8/2000 Cetnar .................... E05B 77/26 292/201
6,190,209 B1 * 2/2001 Hulsmann ............... E05B 85/02 439/74

(Continued)

FOREIGN PATENT DOCUMENTS

DE 4222018 C1 * 6/1993 ............. E05B 81/06
DE 19632995 A1 * 2/1998 ............. E05B 81/64

(Continued)

OTHER PUBLICATIONS

Machine translation of KR 101356996 B1 (Year: 2024).*
International Search Report issued in corresonding International Patent Application No. PCT/JP2019/041980, dated Jan. 7, 2020, with English translation.

*Primary Examiner* — Kristina R Fulton
*Assistant Examiner* — Emily G. Brown
(74) *Attorney, Agent, or Firm* — Rimon P.C.

(57) ABSTRACT

A door latch device includes: a first position switch and a second position switch, each including a first contact hole, a second contact hole, and a common contact hole; a common pin configured to be electrically conducted to the common contact hole of the first position switch and the first contact hole of the second position switch by being inserted therein; a first signal pin configured to be electrically conducted to the first contact hole of the first position switch by being inserted therein; and a second signal pin configured to be electrically conducted to the common contact of the second position switch by being inserted therein, wherein the first position switch and the second position switch are config- (Continued)

ured to perform a switch operation at a same timing of an operation of a predetermined operation detection target.

6 Claims, 17 Drawing Sheets

(51) Int. Cl.
*E05B 81/14* (2014.01)
*E05B 81/90* (2014.01)
*H01H 1/14* (2006.01)

(58) Field of Classification Search
CPC .... H01H 13/7006; H01R 13/18; H01R 13/20; H01R 13/22; H01R 13/26; H01R 13/40; H01R 13/514; H01R 2201/26; B60R 16/02; B60R 16/023; E05B 2047/0067; E05B 81/61; E05B 81/64–78
USPC ..... 200/51 R, 51.02–51.07, 552, 536, 50, 37
See application file for complete search history.

(56) References Cited

U.S. PATENT DOCUMENTS

| | | | | |
|---|---|---|---|---|
| 2015/0021934 | A1 | 1/2015 | Barmscheidt et al. | |
| 2016/0362916 | A1 | 12/2016 | Tomaszewski | |
| 2018/0016818 | A1 | 1/2018 | Ishiguro et al. | |
| 2018/0066458 | A1 * | 3/2018 | Ishiguro | E05B 77/28 |
| 2018/0080262 | A1 | 3/2018 | Takagi et al. | |
| 2020/0087953 | A1 * | 3/2020 | Odaka | E05B 81/40 |

FOREIGN PATENT DOCUMENTS

| | | | | |
|---|---|---|---|---|
| DE | 102008015627 | A1 * | 10/2009 | E05B 81/06 |
| DE | 102013211827 | A1 * | 12/2014 | H01H 13/52 |
| DE | 102015119233 | A1 * | 7/2016 | E05B 47/0012 |
| GB | 2478620 | A | 9/2011 | |
| JP | 2011-184949 | A | 9/2011 | |
| JP | 6213927 | B2 | 10/2017 | |
| JP | 2018-012967 | A | 1/2018 | |
| JP | 2018-48467 | A | 3/2018 | |
| KR | 101356996 | B1 * | 2/2014 | |
| WO | 2016/129089 | A1 | 8/2016 | |

* cited by examiner

DOOR LATCH DEVICE

CROSS-REFERENCE TO RELATED APPLICATIONS

This application is the U.S. National Phase under 35 U.S.C. § 371 of International Application No. PCT/JP2019/041980, filed on Oct. 25, 2019, which claims the benefit of Japanese Application No. 2019-141668, filed on Jul. 31, 2019, the entire contents of each are hereby incorporated by reference.

FIELD

The present invention relates to a door latch device for closing and opening a vehicle door.

BACKGROUND

A door latch device of a vehicle includes a latch mechanism that latches and unlatches a striker disposed on a main body side of the vehicle, and closes and opens a door by the latch mechanism.

Patent Literature 1 discloses a door latch device including an electric release mechanism that can release engagement between a latch mechanism and a striker by power of a motor, a manual release mechanism that can release engagement of the latch mechanism by manual operation force, and a lock mechanism that can switch between a locked state that disables a release function of the manual release mechanism and an unlocked state that enables the same.

In this door latch device, engagement of the latch mechanism is released exclusively by the electric release mechanism, and the manual release mechanism is disposed as a complement for a case in which the function of the electric release mechanism is disabled due to an accident, a fault in an electrical system, a voltage drop of a battery, and the like. Thus, the lock mechanism is used only for the function of the manual release mechanism, and is always used in the locked state and switched to the unlocked state for a predetermined situation.

In this door latch device, the locked state and the unlocked state of the lock mechanism are switched by normal rotation and reverse rotation of a cam wheel rotated by power of the motor. The cam wheel is held at a reference position by energizing force of a neutral return spring, and has a configuration for switching the lock mechanism to the locked state when normally rotated from the reference position, and switching the lock mechanism to the unlocked state when reversely rotated from the reference position.

Additionally, the cam wheel also releases engagement of the latch mechanism when normally rotated from the reference position. Line to this, the lock mechanism can be switched, and the engagement of the latch mechanism can be released by a single motor.

On the other hand, some door latch devices for closing and opening the vehicle door include electric components such as a motor and a position switch (refer to Patent Literature 2). The position switch is set to detect an operation of a predetermined object to be detected, and detects whether a component of the lock mechanism is at a position indicating the locked state or a position indicating the unlocked state, for example. A detection signal of the position switch is supplied to a predetermined circuit board, and control based thereon is performed.

CITATION LIST

Patent Literature

Patent Literature 1: Japanese Patent No. 6213927

Patent Literature 2: Japanese Laid-open Patent Publication No. 2018-12967

SUMMARY

Technical Problem

In the door latch device disclosed in Patent Literature 1 of what is called a knob-less type not including a locking/unlocking knob for manually switching the lock mechanism, manual switching to an unlocked state using a key and switching to the unlocked state by power of the motor are not required to be used unless a predetermined situation is caused. Thus, the lock mechanism does not work by a normal operation, and is maintained in the locked state for a long time. As a result, there is the concern that grease is hardened due to long-term deterioration, or a spring, a lever, and the like made of steel material rust, and the lock mechanism does not smoothly function in a predetermined situation. Thus, there is a demand for a door latch device in which the lock mechanism smoothly functions in a predetermined situation.

In the door latch device disclosed in Patent Literature 1, the lock mechanism is switched from the unlocked state to the locked state on the condition that engagement of the latch mechanism is released, so that the lock mechanism cannot be singly switched from the unlocked state to the locked state without releasing engagement of the latch mechanism by a single motor. Thus, there is a demand for a door latch device that can release engagement of the latch mechanism and switch the lock mechanism to the locked state and the unlocked state by a single motor. At this point, it is preferable that unnecessary sound that bothers a user is not generated.

On the other hand, an operation of the object to be detected is detected by the position switch, the detection signal read by a CPU, and control based on the detection signal performed. If the position switch breaks down, the operation of the object to be detected cannot be detected, so that there is the inconvenience that control related thereto is not performed.

The present invention is made in view of the problem described above, and provides a door latch device that can detect an operation of an object to be detected more securely.

Solution to Problem

To solve the above-described problem and achieve the object, a door latch device according to the present invention includes: a first posit on switch and a second position switch, each of the first position switch and the second position switch including a first contact hole connected to one of a normally open contact or a normally closed contact, a second contact hole connected to a contact having a reverse format of the first contact hole, and a common contact hole connected to a common contact, wherein the first contact hole, the second contact hole and the common contact hole are arranged on a straight line, the first position switch and the second position switch are disposed at positions shifted from each other along the straight line and stacked in a piercing direction of the first contact hole, the second contact hole, and the common contact; a common pin configured to be electrically conducted to the common contact hole of the first position switch and the first contact hole of the second position switch by being inserted therein; a first signal pin configured to be electrically conducted to the first contact hole of the first position switch by being inserted therein; and a second signal pin configured to be electrically conducted to the common contact of the second position switch by being inserted therein, wherein the first position switch and the second position switch are configured to perform a switch operation at a same timing of an operation of a predetermined operation detection target.

The door latch device may include a circuit board, and each of the common pin, the first signal n and the second signal pin may be erected from the circuit board.

A space in which the circuit board may be disposed and a space in which the first position switch and the second position switch are disposed are partitioned with a partition plate, and the first signal pin, the second signal pin and the common pin may be configured to pierce pin holes formed on the partition plate and project from one of the spaces to another one of the spaces.

In the space in which the circuit board is disposed, waterproof treatment may be, applied to the space in which the first position switch and the second position switch are: disposed, around the pin holes.

The operation detection target may include a first cam configured to act on an actuator of the first position switch, and a second cam configured to act on an actuator of the second position switch, and the first cam and the second cam may be shifted from each other in a stacking direction of the first position switch and the second position switch, and be disposed at positions shifted from each other along the straight line.

The door latch device may includes a latch mechanism configured to hold a door of a vehicle in a closed state; an electric release unit configured to release the latch mechanism by power of a motor; a manual release unit configured to release the latch mechanism by manual operation force; and a lock mechanism configured to switch between a locked state for disabling a function of the manual release unit and an unlocked state for enabling the same, and the operation detection target may be a component whose position is switched depending on whether the lock mechanism is in the locked state or the unlocked state, and the first position switch and the second position switch may be configured to detect whether the operation detection target is in the locked state or the Advantageous Effects of Invention With the door latch device according to the present invention, the operation of the object to be detected is read twice by a stacked first position switch and second position switch, and the operation thereof can be detected more securely.

DESCRIPTION OF EMBODIMENTS

Figure 1:
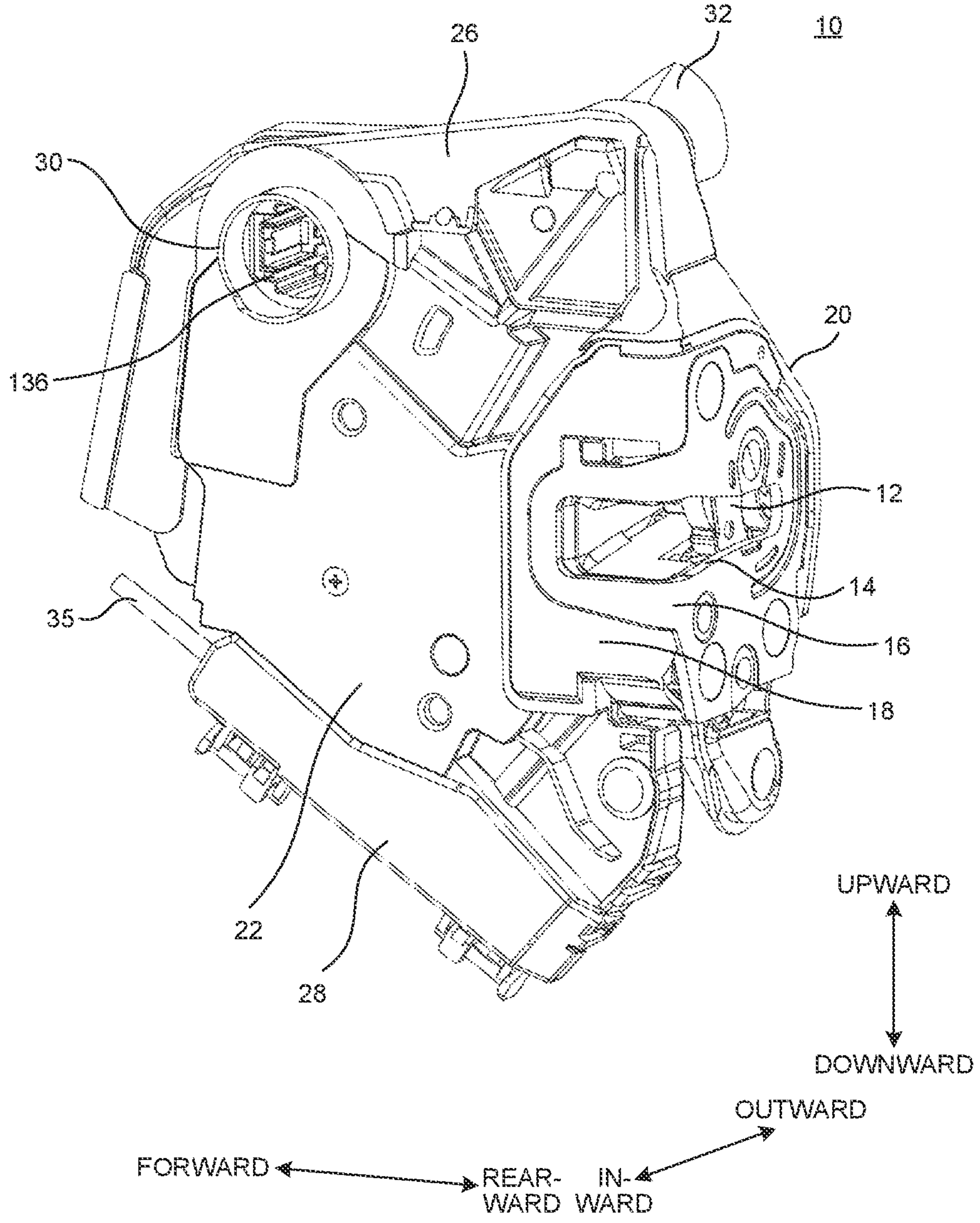
FIG. 1 is a perspective view of a door latch device according to an embodiment viewed from obliquely rearward on the outside of a vehicle.

The following describes an embodiment of a door latch device according to the present invention in detail based on the drawings. The present invention is not limited to the embodiment.

In the following description, representation of directions in the description of a door latch device 10 is based on the vehicle. As the directions based on the vehicle, upward and downward, inward and outward (that is, an indoor side and an outdoor side), and forward and rearward are indicated by arrows when appropriate in the drawings. Representation of a rotation direction (a clockwise direction, a counterclockwise direction) of a rotary component basically corresponds to the drawing that is referred to at the present point. The door latch device 10 exemplified in each of the drawings is a door latch device applied to a right side door of the vehicle, but a door latch device applied to a left side door may have a symmetrical structure.

Figure 2:
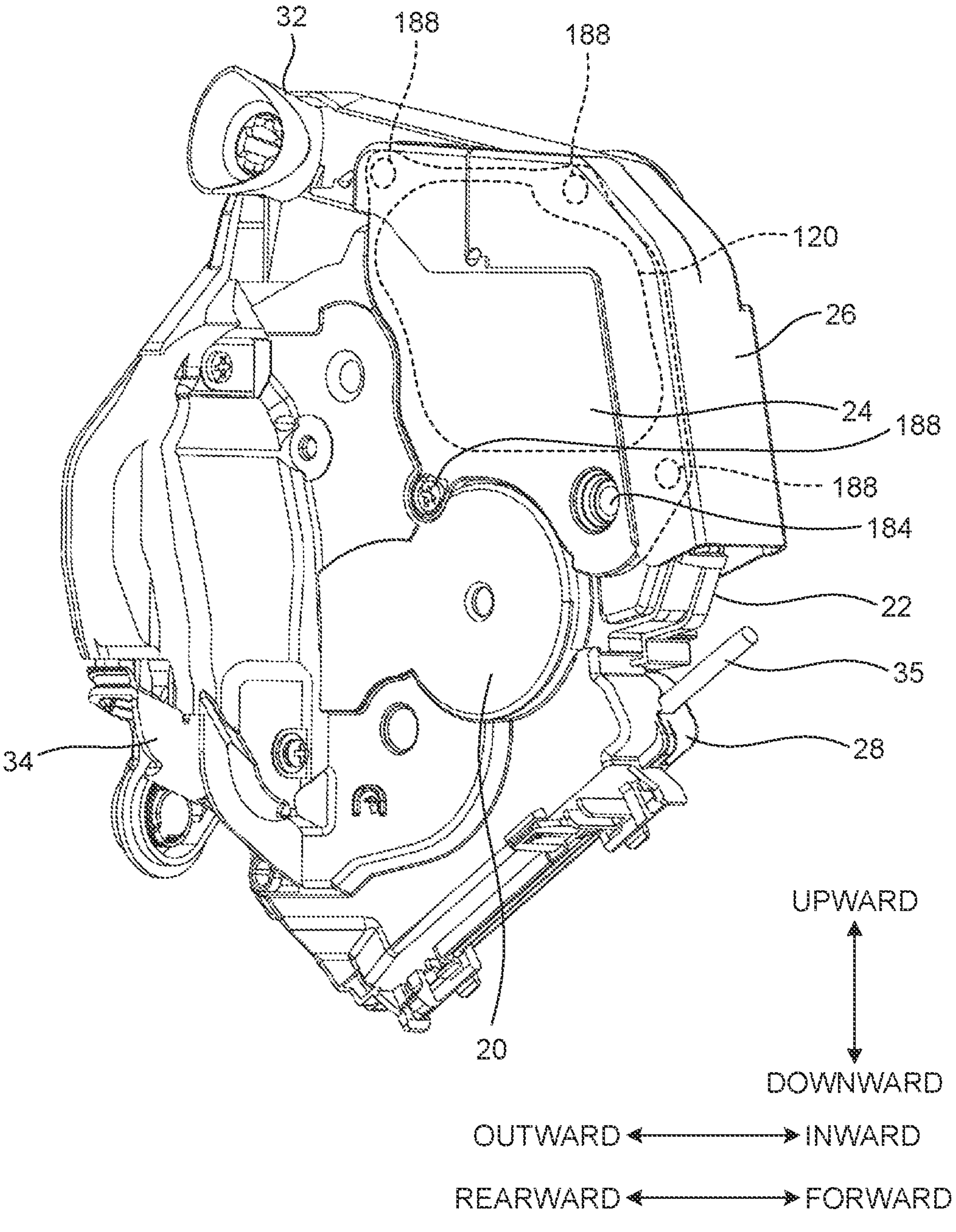
FIG. 2 is a perspective view of the door latch device viewed from obliquely forward on the outside of the vehicle.

FIG. 1 is a perspective view of the door latch device 10 according to the present embodiment viewed from obliquely rearward, and FIG. 2 is a perspective view of the door latch device 10 viewed from obliquely forward on the outside of the vehicle.

The door latch device 10 is attached to an inner part of the door of the vehicle, and closes and opens the door by latching and unlatching a striker disposed on a main body side of the vehicle. For example, the door latch device 10 is disposed to latch the striker on a side door of the vehicle, but the "door" has a broad sense, and may be applied to a hood, a trunk lid, a tail gate, and the like. First, the following describes a schematic entire configuration of the door latch device 10.

As illustrated in FIG. 1 and FIG. 2, in the door latch device 10, a latch 12 that latches the striker is disposed at the back of a striker entry groove 14. The latch 12 is part of a latch mechanism 44 described later. The striker entry groove 14 is formed as part of a cover plate 16. A body 18 is disposed around the cover plate 16. An inner side and a rear side of the latch mechanism 44 are covered by the cover plate 16 and the body 18.

The door latch device 10 is covered by a case 20, a first cover 22, and a second cover 24 in addition to the cover plate 16 and the body 18 described above. The case 20 mainly covers an outer side, the first cover 22 mainly covers an inner side, and the second cover 24 further covers a forward upper part of the inner side of the case 20. The cover plate 16, the body 18, the case 20, the first cover 22, and the second cover 24 form a housing of the door latch device 10.

The door latch device 10 further includes a waterproof cover 26 that covers an upper surface, a cable cover 28 on an inner lower side, a coupler 30 disposed on an inner upper part, and a key cylinder coupling part 32 disposed on an outer upper part. The waterproof cover 26 covers a boundary part between the case 20 and the first cover 22, and the second cover 24 from above to prevent entry of waterdrops. The cable cover 28 covers a connecting portion for a cable 35. The cable 35 is connected to an inner handle (not illustrated). A harness connector (not illustrated) is connected to the coupler 30. A sponge may be disposed around the coupler 30. The key cylinder coupling part 32 is a portion into which a key is inserted to be operated. An end part of an outer lever 34 connected to an outer handle (not illustrated) is exposed to an outer surface of the door latch device 10.

Figure 3:
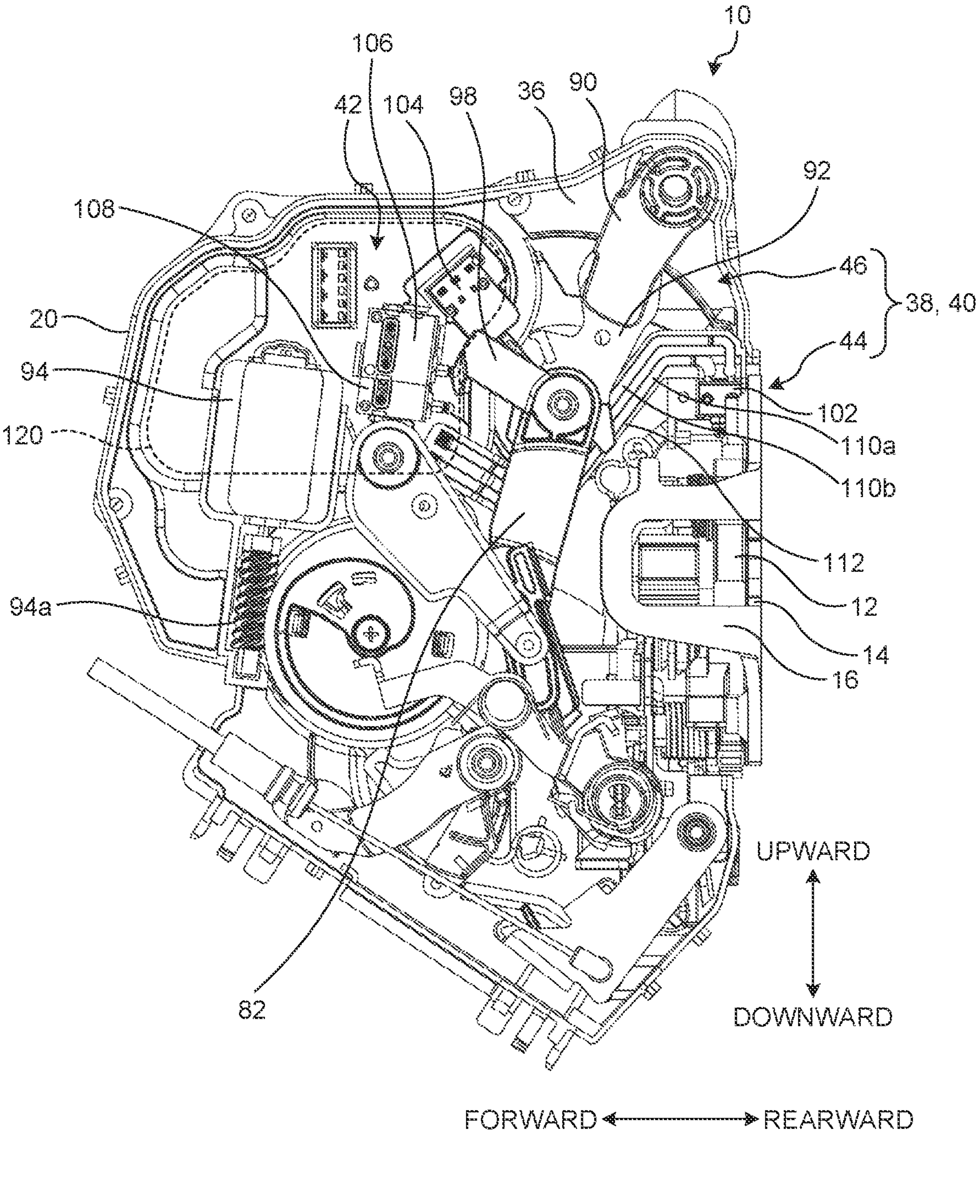
FIG. 3 is a side view illustrating an inner part of the door latch device.

FIG. 3 is a side view illustrating an inner part of the door latch device 10. FIG. 3 illustrates the door latch device 10 in a state in which the body 18, the first cover 22, the waterproof cover 26, and the cable cover 28 are removed.

As illustrated in FIG. 3, a first housing space 36 is formed inside the door latch device 10. The first housing space 36 is a region the outer side of which is covered by the case 20, and the inner side thereof is mainly covered by the first cover 22. The inner side of the first housing space 36 is covered by the cover plate 16, the body 18, and the cable cover 28 in addition to the first cover 22.

The first housing space 36 can be briefly partitioned into a mechanism region 40 in which a machine mechanism 38 is disposed, and an electric component region 42 in which electric components are disposed. The electric component region 42 occupies a forward upper part, and the mechanism region 40 occupies a remaining portion. The machine mechanism 38 includes a latch mechanism 44 that latches and unlatches the striker with the latch 12, and a lock mechanism 46 that causes the latch mechanism 44 to be in a locked state and an unlocked state. The latch mechanism 44 is disposed rearward in the first housing space 36, and covered by the cover plate 16 and the body 18. In the door latch device 10, a second housing space 124 (refer to FIG. 10) is formed in addition to the first housing space 36. The second housing space 124 will be described later.

The machine mechanism 38 also includes an electric release unit that can release the latch mechanism 44 by power of a motor 94, and a manual release unit that can release the latch mechanism 44 by manual operation force. The electric release unit is a unit that includes the motor 94, a cam wheel 76, and the like (described later), and unlatches the striker. The manual release unit is a unit that unlatches the striker via the outer lever 34 that mechanically interlocks with a manual operation and an inner lever 59 (described later).

Figure 4:
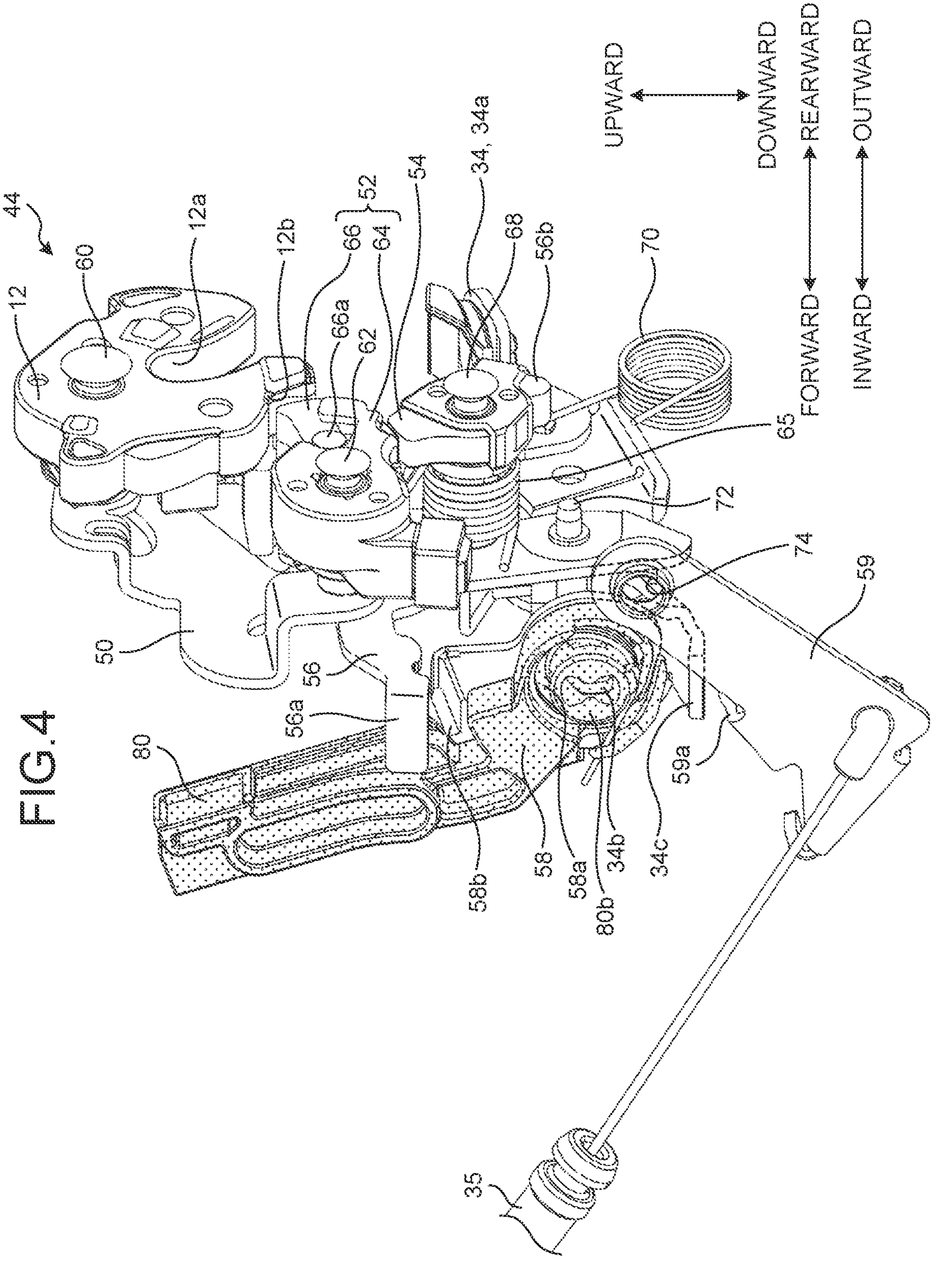
FIG. 4 is a perspective view of a latch mechanism.

FIG. 4 is a perspective view of the latch mechanism 44. As illustrated in FIG. 4, the latch mechanism 44 includes a base bracket 50, a ratchet 52, a ratchet holder 54, a ratchet lever 56, an anti-panic lever 58, and the inner lever 59 in addition to the latch 12 and the outer lever 34 described above. Each element of the latch mechanism 44 is supported or pivotally supported by the base bracket 50.

The latch 12 is pivotally supported by a shaft part 60, and includes a striker engagement groove **12*a* and a ratchet engagement part 12*b*. The latch 12 rotates against a spring (not illustrated) when the striker enters the striker engagement groove 12*a* from a door-opened state, latches the striker at a full-latch position when the ratchet 52 engages with the ratchet engagement part 12*b***, and closes the door.

The ratchet 52 includes a base lever 64 pivotally supported by a shaft part 62, and a pole lever 66 including a base shaft part **66*a* pivotally supported by the base lever 64. The base lever 64 is elastically energized by a spring 65. The pole lever 66 bends within a predetermined angle range with respect to the base lever 64. The ratchet 52 is supported by the ratchet holder 54 from a side to hold a substantially linear attitude of the ratchet 52, and a distal end of the pole lever 66 engages with the ratchet engagement part 12*b* to hold the latch 12** at the full-latch position.

The ratchet holder 54 is pivotally supported by a shaft part 68, and elastically energised by a spring 70 to laterally support the base lever 64. The ratchet holder 54 rotates against elastic force of the spring 70 based on an operation of the ratchet lever 56, and is separated from the base lever 64. The base lever 64 and the pole lever 66 of the ratchet 52 are then caused to be in a buckling state with respect to the base shaft part **66*a*, and the pole lever 66 is detached from the ratchet engagement part 12*b* to open the latch 12. The latch 12 rotates by elastic force to unlatch the striker, and opens the door. By operating the ratchet 52 via the ratchet holder 54, the operation is enabled to be performed by lighter force as compared with a case of directly operating the ratchet 52**.

The ratchet lever 56 is pivotally supported by the base bracket 50, and includes a passive part **56*a* projecting inward from a rotor shaft, and an action part 56*b* projecting outward from the rotor shaft. In the ratchet lever 56, the action part 56*b* rotates the ratchet holder 54 when the passive part 56*a*** moves upward.

The outer lever 34 is pivotally supported by a shaft part 72, and includes a handle operating part **34*a* projecting outward from the shaft part 72, and an action part 34*b* and a lever passive piece 34*c* projecting inward from the shaft part 72. The handle operating part 34*a* is a portion operated by the outer handle. The action part 34***h* is inserted into a hole 58*a* of the anti-panic lever 58, and acts on the anti-panic lever 58. The action part 34*b* is also inserted into a deformed hole 80*b* of an open link 80 (described later). The lever passive piece 34*c* is disposed below the action part 34*b*, and operated by the inner lever 59. The outer lever 34 is rotated by an operation of the handle operating part 34*a* or the lever passive piece 34*c*, and pushes up the anti-panic lever 58.

The inner lever 59 is pivotally supported by a shaft part 74, and is swung when the cable 35 is operated, whereby an operation piece 59*a* pushes up the lever passive piece 34*c*.

The anti-panic lever 58 includes the hole 58*a* into which the action part 34*b* is inserted, and an action piece 58*b* bent at an upper part. The anti-panic lever 58 is pushed up by the action part 34*b* due to rotation of the outer lever 34 when the open link 80 (described later) is at an unlocked position, and the action piece 58*b* pushes up the passive part 56*a* of the ratchet lever 56. Due to this, the ratchet holder 54 and the ratchet 52 perform an unlatch operation. The anti-panic lever 58 has a structure separated from the open link 80 for an anti-panic mechanism.

Figure 5:
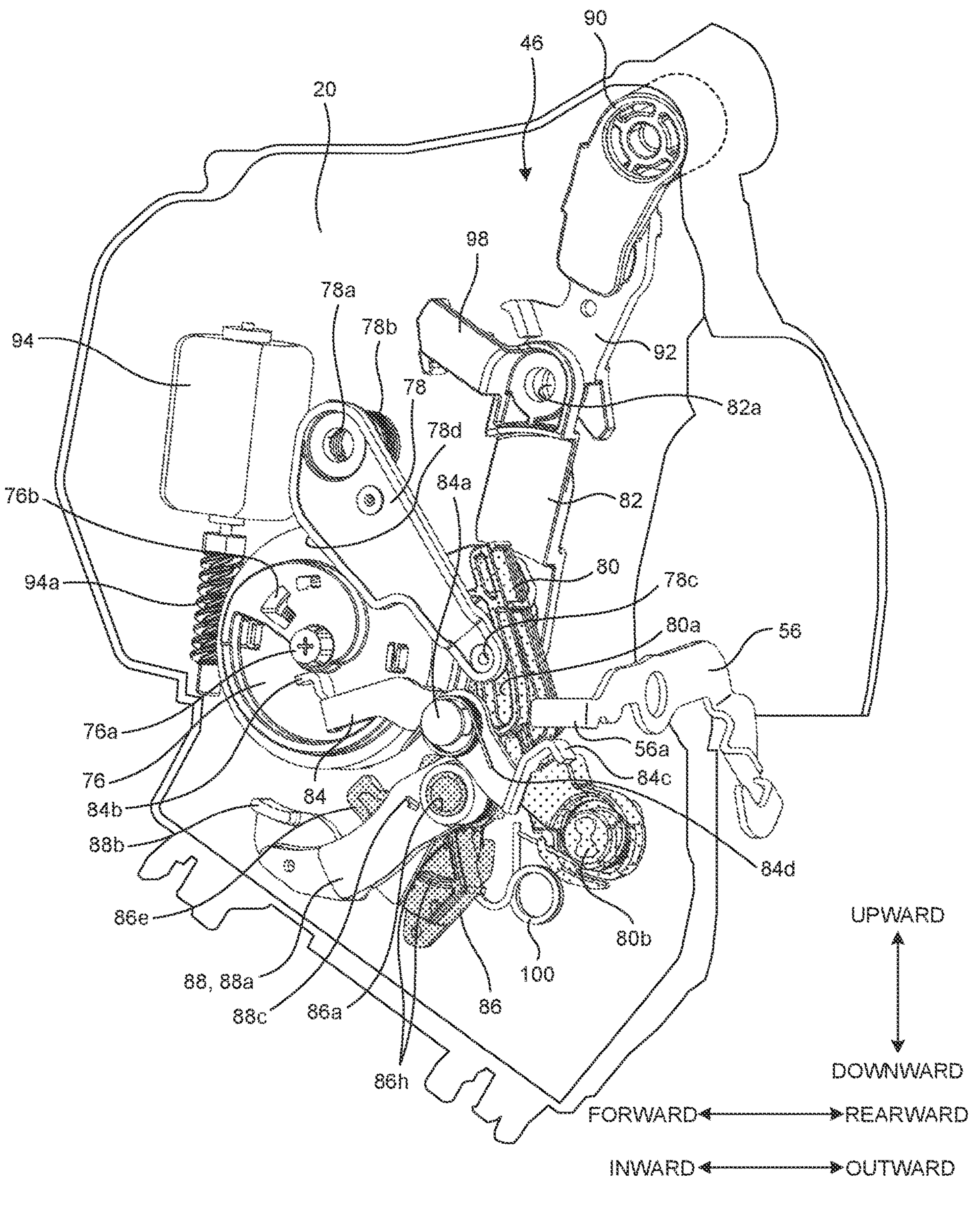
FIG. 5 is a perspective view of the lock mechanism viewed from obliquely inside rearward.
Figure 6:
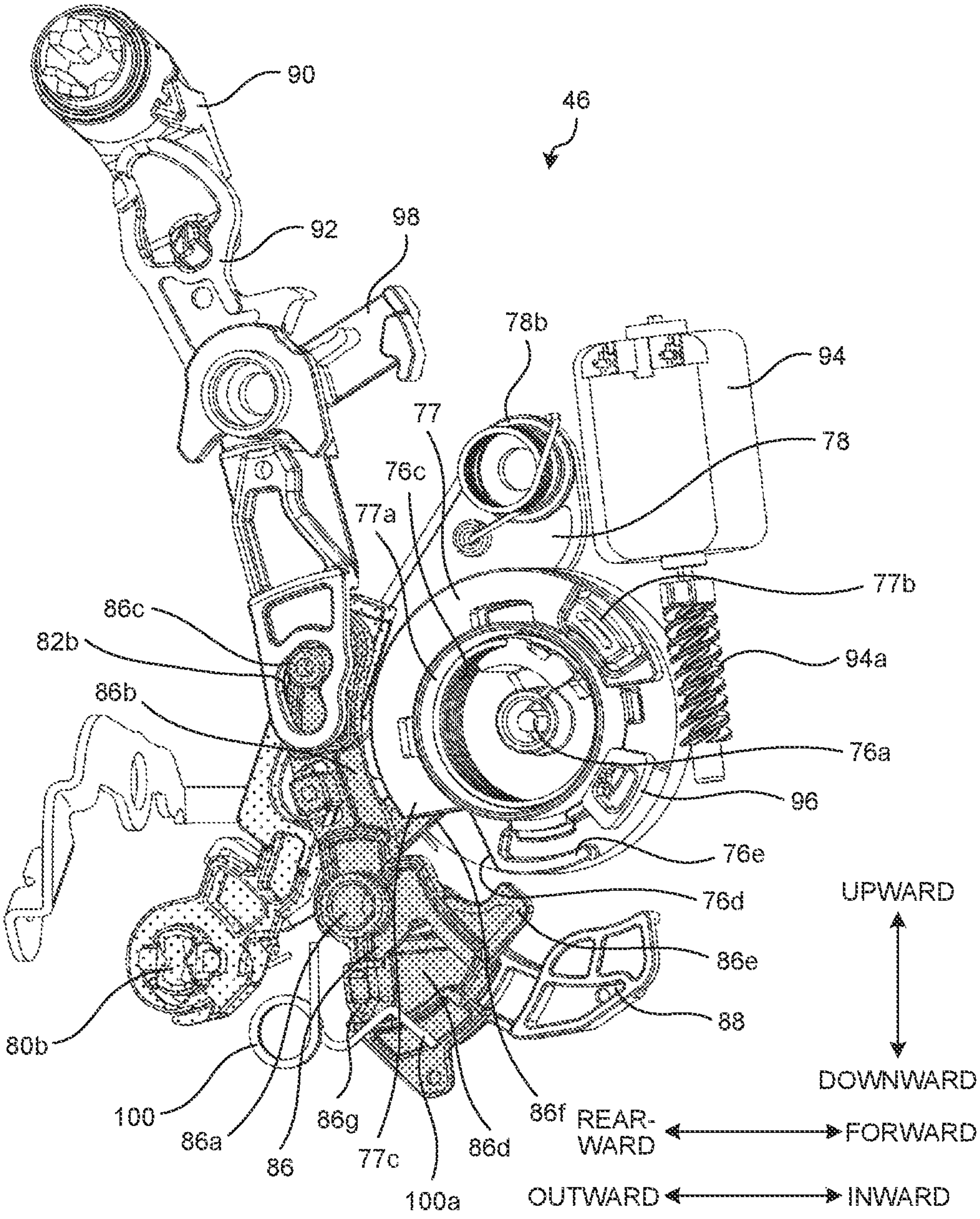
FIG. 6 is a perspective view of the lock mechanism viewed from obliquely outside forward.

FIG. 5 is a perspective view of the lock mechanism 46 viewed from obliquely inside rearward, and FIG. 6 is a perspective view of the lock mechanism 46 viewed from obliquely outside forward. In FIG. 5, the case 20 is also briefly illustrated so that arrangement of the lock mechanism 46 can be understood. In FIG. 5 and FIG. 6, the lock mechanism 46 is in the locked state.

As illustrated in FIG. 5 and FIG. 6, the lock mechanism 46 includes a cam wheel 76 pivotally supported by a shaft part 76*a*, a cam lever 78 that is pivotally supported by a shaft part 78*a* and driven by the cam wheel 76, the open link (position switching member) 80 driven by the cam lever 78, a sub-lock lever 82 interlocking with the open link 80, and an open lever 84 that is pivotally supported by a shaft part 84*a* and driven by the cam wheel 76. The lock mechanism 46 further includes a lock lever 86 and an auxiliary lever 88 interlocking with the sub-lock lever 82, and a key lever 90 and a sub-key lever 92 that interlock with a key operation to drive the sub-lock lever 82. For facilitating identification of components in each drawing, the lock lever 86 is represented by a dark dot pattern, and the open link 80 is represented by a light dot pattern.

The cam wheel 76 has a disk shape, and rotates when teeth disposed on an outer peripheral surface are driven by a worm 94*a* of a rotor shaft of the motor 94. The teeth are not illustrated. The motor 94 is disposed in the electric component region 42 (refer to FIG. 3). A rotation direction of the cam wheel 76 is represented such that a clockwise direction indicates normal rotation, and a counterclockwise direction indicates reverse rotation based on FIG. 5.

The cam wheel 76 includes a cam 76*b*. The cam 76*b* has a shape having a diameter that gradually increases, from immediately below the shaft part 76*a* in the counterclockwise direction across about 270°, when the cam wheel 76 is at a reference position. The diameter thereof is close to a radius of the cam wheel 76 at a position of about 270°, and the diameter is maintained in the counterclockwise direction to a position of about 180°.

As illustrated in FIG. 6, an auxiliary component 77 is disposed on an inner surface of the cam wheel 76. The cam wheel 76 and the auxiliary component 77 are fixed to be substantially one component. A spring 76*c* is disposed inside a sleeve 77*a* formed of the auxiliary component 77. The spring 76*c* energizes the cam wheel 76 to be at a neutral reference position. The cam wheel 76 can normally rotate and reversely rotate against the spring 76*c* from the reference position due to action of the motor 94.

The auxiliary component 77 includes a projection 77*b* projecting inward from an outer circumference vicinity part, and a first inclined wall 77*c* disposed on substantially the opposite side of the projection 77*b*. The projection 77*b* abuts on an elastic stopper 96 disposed in the case 20 (refer to FIG. 2) when the cam wheel 76 reversely rotates, and restricts rotation of the cam wheel 76. The first inclined wall 77*c* is formed such that the width thereof is increased in the counterclockwise direction from a sleeve surface of the sleeve 77*a* in a radial direction.

The cam wheel 76 further includes a second inclined wall 76*d* and a holding wall 76*e*. The second inclined wall 76*d* is formed such that the width thereof is increased in the clockwise direction from the sleeve surface of the sleeve 77*a* in the radial direction. The first inclined wall 77*c* and the second inclined wall 76*d* are formed to be opposed to each other at close positions, and are inclined in reverse directions. The first inclined wall 77*c* is disposed on an outer side as compared with the second inclined wall 76*d*. The holding wall, 76*e* is a wall having a circular arc shape that is disposed on a side slightly closer to the counterclockwise direction than the second inclined wall 76*d*, and projects outward along a peripheral surface of the cam wheel 76. As illustrated in FIG. 6, a clockwise direction side of the holding wall 76*e* is closed, and a counterclockwise direction side thereof is opened.

Returning to FIG. 5, a lower surface 78*d* of the cam lever 78 abuts on the cam 76*b*, and when the cam wheel 76 rotates, the cam lever 78 is driven by the cam 76*b* to swing against a spring 78*b* in the counterclockwise direction. A knob 78*c* at a distal end of the cam lever 78 is fitted into a side surface guide groove 80*a* of the open link 80, and erects the inclined open link 80 when the cam lever 78 swings in the clockwise direction.

The deformed hole 80*b* is formed at a lower end of the open link 80, The action part 34*b* of the outer lever 34 (refer to FIG. 4) is inserted into the deformed hole 80*b*, and the open link 80 is lifted up by an operation of the outer lever 34. The anti-panic lever 58 is assembled to a lower end of the open link 80, and moves up and down, and is inclined integrally with the open link 80.

Figure 8:
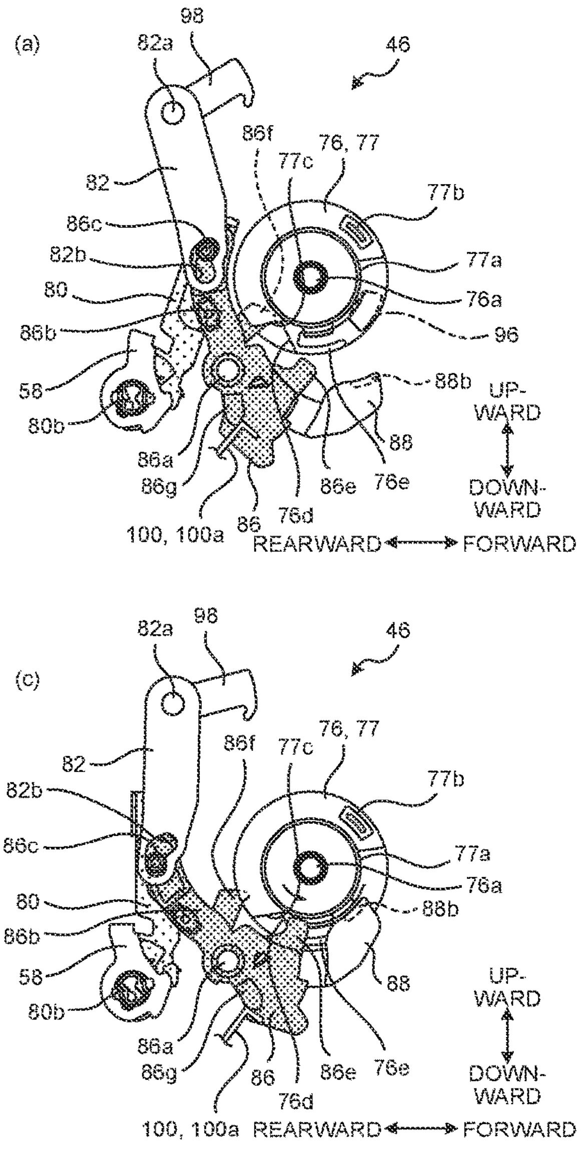
FIG. 8 is a diagram for explaining the operation of the lock mechanism at the time when the cam wheel reversely rotates and normally rotates, (a) is a diagram illustrating a basic state in which the cam wheel is at the reference position, (b) is a diagram illustrating a state in which the cam wheel reversely rotates from the reference position by about 40°, (c) is a diagram illustrating a state in which the cam wheel normally rotates from the state of (b) by about 40°, and (d) is a diagram illustrating a state in which the cam wheel normally rotates from the state of (c) by about 40°.

The open link 80 is a component to be switched to a locked position of an inclined attitude (an attitude in FIG. 5) and an unlocked position of an erected attitude (refer to FIG. 8 (*b*)) by the cam lever 78. The lock mechanism 46 is caused to be in a locked state when the open link 80 is at the locked position, and the lock mechanism 46 is caused to be in an unlocked state when the open link 80 is at the unlocked position. A position of the open link 80 is switched by the lock lever 86.

That is, when the open link 80 is at the locked position, the anti-panic lever 58 (refer to FIG. 4) does not abut on the ratchet lever 56 (refer to FIG. 4) even in a case of being lifted up by the outer lever 34 because the anti-panic lever 58 is inclined together with the open link 80, that is, an attempt fails. Thus, the ratchet lever 56 does not operate, and the door is kept being closed as the locked state.

On the other hand, when the open link 80 is at the unlocked position and lifted up by the outer lever 34, the anti-panic lever 58 is erected together with the open link 80, so that the anti-panic lever 58 abuts on and pushes up the ratchet lever 56. Thus, the ratchet lever 56 operates to cause the unlocked state in which the door may be opened.

The sub-lock lever 82 is pivotally supported by a shaft part 82*a* to be able to swing, and is swung and driven by the key lever 90 and the sub-key lever 92 to switch between the locked position and the unlocked position of the open link 80. That is, the sub-lock lever 82 can switch between the locked state and the unlocked state.

Figure 7:
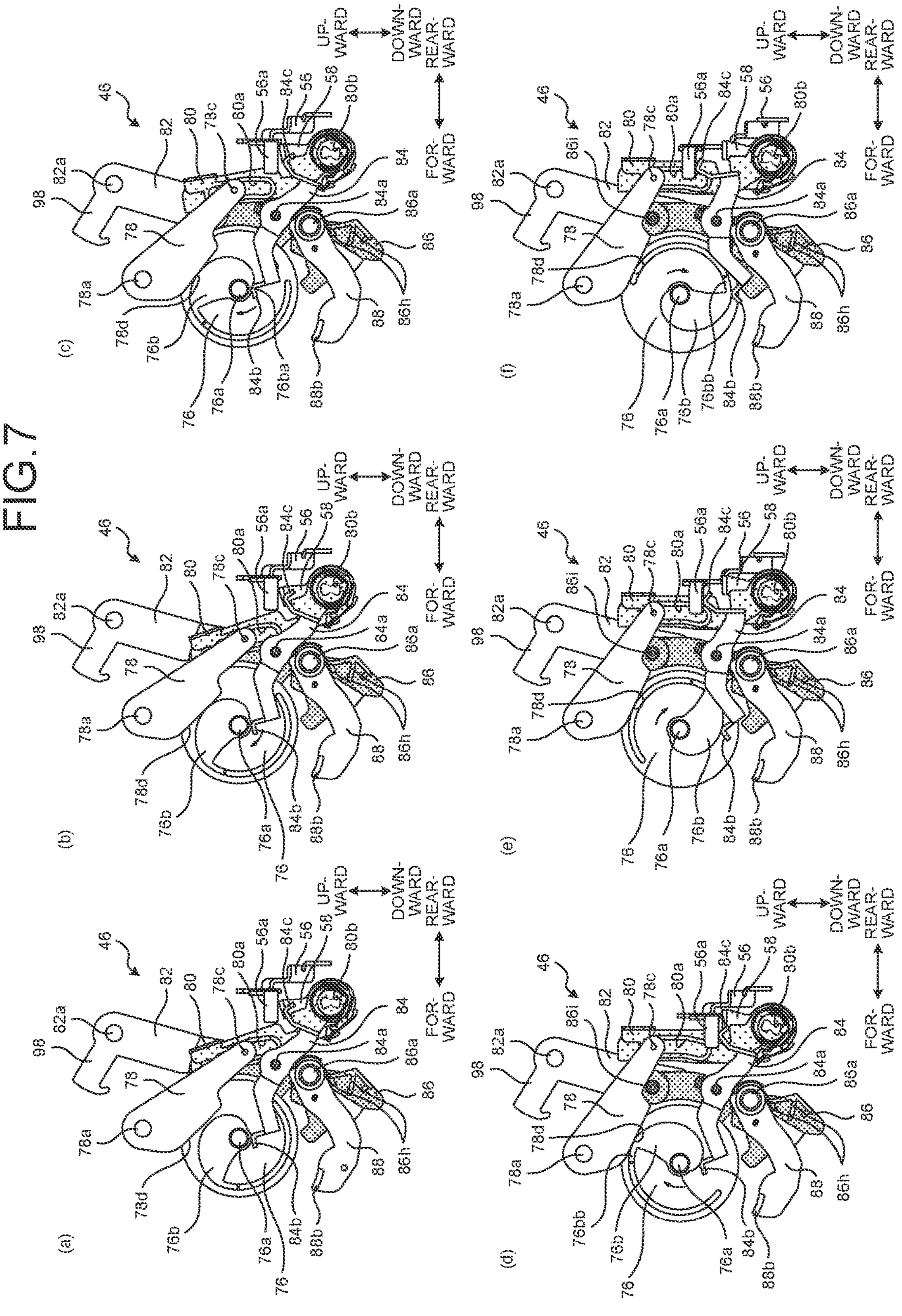
FIG. 7 is a diagram for explaininq an operation of the lock mechanism at the time when a cam wheel normally rotates, (a) is a diagram illustrating a basic state in which the cam wheel is at a reference position, (b) is a diagram illustrating a state in which the cam wheel normally and slightly rotates from the reference position, (c) is a diagram illustrating a state in which the cam wheel normally rotates from the reference position by about 40°, (d) is a diagram illustrating a state in which the cam wheel normally rotates from the reference position by about 90°, (e) is a diagram illustrating a state in which the cam wheel normally rotates from the reference position by about 190° and (f) is a diagram illustrating a state in which the cam wheel normally rotates from the reference position by about 250°).

When the sub-lock lever 82 swings in the counterclockwise direction under action of the key lever 90 and the sub-key lever 92, an upper portion of the open link 80 is pushed out from the sub-lock lever 82 via an inner knob 86*i* (refer to FIG. 7(*d*)) of the lock lever 86, and swings in the clockwise direction to be at the unlocked position. When the sub-lock lever 82 swings in the clockwise direction to return to a previous position, elastic force of the spring 78*b* is transmitted to the open link 80 via the cam lever 78, and the open link 80 swings in the counterclockwise direction to be at the locked position. An arm 98 projecting forward from the shaft part 82*a* is disposed at an upper part of the sub-lock lever 82. The arm 98 is used as a unit for identifying whether the lock mechanism 46 is in the locked state or the unlocked state, and performs switching operation between a first lock position switch 106 and a second lock position switch 108 (refer to FIG. 3) described later.

The open lever 84 is a component used for opening the door based on electric release, that is, a switch operation and the like performed by a driver. The open lever 84 includes a cam passive part 84*b* projecting forward and a ratchet operation part 84*c* projecting rearward, and is energized in the clockwise direction by a spring 84*d*. When the cam wheel 76 normally rotates, the cam 76*b* pushes down the cam passive part 84*b*, the open lever 84 rotates against the spring 84*d* in the counterclockwise direction about the shaft part 84*a*, and the ratchet operation part 84*c* moves upward. When the ratchet operation part 84*c* moves upward, the passive part 56*a* of the ratchet lever 56 is pushed up, and the latch mechanism 44 is unlatched to open the door When the cam wheel 76 returns to the reference position, the open lever 84 is also returned to a reference attitude by the spring 84*d*.

The open lever 84 can operate the ratchet lever 56 independently of the open link 80. Thus, with the open lever 84, the door can be opened based on the electric release unit even when the lock mechanism 46 is in the locked state (that is, the open link 80 is at the locked position).

As illustrated in FIG. 6, the lock lever 86 is pivotally supported by a shaft part 86*a*, and includes an arm 86*b* extending upward, an outer knob 86*c* projecting outward from a distal end of the arm 86*b*, a first projection 86*e* projecting forward from a downward extending Part 86*d* a second projection 861 projecting forward from the vicinity of the shaft part 86*a*, a spring reception part 86*g* projecting outward from the downward extending part 86*d* and two push-out parts 86*h*. The outer knob 86*c* is fitted into a guide hole 82*b* formed at a lower end of the sub-lock lever 82. When the sub-lock lever 82 swings, the lock lever 86 is swung by the outer knob 86*c*. The lock lever 86 can be displaced to an acting position for switching the open link 80 from the locked position to the unlocked position, and a non-acting position at which switching action is not performed on the open link 80. The lock lever 86 is driven by the cam wheel 76 or the sub-lock lever 82.

The spring reception part 86*g* abuts on a bending part 100 of a spring 100. When the sub-lock lever 82 swings, the spring reception part 86*g* gets over the bending part 100 while elastically deforming the bending part 100*a* to be disposed at any one of the locked position and the unlocked position. Accordingly, the sub-lock lever 82 may take any one of the locked attitude illustrated in FIG. 6 and the unlocked attitude (refer to FIG. 8(*b*)).

The first projection 86*e* is pushed out by the first inclined wall 77*c* Due to this, the lock lever 86 rotates in the clockwise direction. The second projection 86*f* is pushed out by the second inclined wall 76*d*. Due to this, the lock lever 86 rotates in the counterclockwise direction. The second projection 86*f* can enter a gap between a side surface of the cam wheel 76 and the first inclined wall 77*c*. The two push-out parts 86*h* supports the auxiliary lever 88 from below.

As illustrated in FIG. 5, the auxiliary lever 88 is pivotally supported by the shaft part 86*a* similarly to the lock lever 86, and includes an arm 86*a* projecting forward and a circular arc projection 88*b* disposed on an upper part of a distal end of the arm 88*a* The circular arc projection 88*b* has a shape that can engage with the holding wall 76*e* (refer to FIG. 6). The auxiliary lever 88 is energized against the lock lever 86 in the counterclockwise direction by a spring 88*c*, and a lower surface thereof abuts on the push-out part 86*h* to be supported.

Next, the following describes action of the lock mechanism 46.

FIG. 7 is a diagram for explaining an operation of the lock mechanism 46 at the time when the cam wheel 76 normally rotates, (a) is a diagram illustrating a basic state in which the cam wheel 76 is at a reference position, (b) is a diagram illustrating a state in which the cam wheel 76 normally and slightly rotates from the reference position, (c) is a diagram illustrating a state in which the cam wheel 76 normally rotates from the reference position by about 40°, (d) is a diagram illustrating a state in which the cam wheel 76 normally rotates from the reference position by about 90°, (e) is a diagram illustrating a state in which the cam wheel 76 normally rotates from the reference position by about 190°, and (f) is a diagram illustrating a state in which the cam wheel 76 normally rotates from the reference position by about 250°. FIG. 7 is a diagram of the lock mechanism 46 viewed from the inside, and normal rotation of the cam wheel 76 is the clockwise direction.

The cam wheel 76 normally rotates from the basic state illustrated in FIG. 7(*a*) due to action of the motor 94. As illustrated in FIG. 7(*b*), when the cam wheel 76 slightly rotates, the cam 76*b* abuts on the lower surface 78*d* of the cam lever 78 and starts to drive the cam lever 78 in the counterclockwise direction. As illustrated in FIG. 7(*c*), when the cam wheel 76 rotates by about 40°, a radius expansion starting part 76*ba* of the cam 76*b* abuts on the cam passive part 84*b* of the open lever 84, and starts to drive the open lever 84 in the counterclockwise direction. As illustrated in FIG. 7(*d*), when the cam wheel 76 rotates by about 90°, a maximum diameter circular arc part 76*bb* of the cam 761 reaches the lower surface 78*d* of the cam lever 78, the cam lever 78 is maximally displaced in the counterclockwise direction, and the maximum displacement is maintained thereafter until the state illustrated in FIG. 7(*f*) is caused. When the cam lever 78 is maximally displaced, the open link 80 is pushed out by the knob 78*c*, and swings to be at the unlatched position. However, at this point, the sub-lock lever 82, the lock lever 86, and the auxiliary lever 88 do not operate and maintain attitudes in FIG. 7(*a*).

When the open lever 84 rotates in the counterclockwise direction, the ratchet operation part 84*c* abuts on and pushes up the passive part 56*a* of the ratchet lever 56. When the passive part 56*a* is pushed up, the ratchet lever 56 starts to rotate about an axis.

As illustrated in FIG. 7(*e*), when the cam wheel 76 rotates by about 190°, the open lever 84 is driven the counterclockwise direction, and the ratchet operation part 84*c* pushes up the passive part 56*a* of the ratchet lever 56. Substantially at this point, the open lever 84 starts to act on the ratchet holder 54 (refer to FIG. 4), and an unlatch operation is started.

As illustrated in FIG. 7(*f*), when the cam wheel 76 rotates by about 250°, the maximum diameter circular arc part 76*bb* of the cam 76*b* reaches the cam passive part 84*b*, the open lever 84 is maximally displaced in the counterclockwise direction, the passive part 56*a* of the ratchet lever 56 is sufficiently pushed up, the latch mechanism 44 unlatches the striker, and the door is opened. Thereafter, by stopping electric supply to the motor 94, the am wheel 76 rotates in the counterclockwise direction due to action of the spring 76*c* (refer to FIG. 6), and the lock mechanism 46 returns to the basic state illustrated in FIG. 7(*a*).

At the time of such electric release, as illustrated in FIGS. 7(*a*) to 7(*f*), the open lever 84 rotates under the action of the motor 94 to work on the latch mechanism 44, and the striker can be unlatched accordingly. At this point, the open link 80 reciprocates between the locked position and the unlocked position. The open link 80 does not act on the other components, but operates at appropriate time intervals in synchronization with the time of auto-release, so that it is possible to prevent grease from being hardened due to long-term deterioration, or prevent a spring, a lever, and the like made of steel material from rusting. Due to this, the lock mechanism 46 is enabled to smoothly operate in a predetermined situation.

Only the open link 80 operates in synchronization with auto-release, and the lock lever 86 does not operate. Thus, the spring reception part 86*q* of the lock lever 86 does not get over a bending part 100*g*, and sound is not generated, so that a sense of incongruity is not given to a user.

FIG. 8 is a diagram for explaining the operation of the lock mechanism 46 at the time when the cam wheel 76 reversely rotates and normally rotates, (a) is a diagram illustrating a basic state in which the cam wheel 76 is at the reference position, (b) is a diagram illustrating a state in which the cam wheel 76 reversely rotates from the reference position by about 40°, (c) is a diagram illustrating a state in which the cam wheel 76 normally rotates from the state of (b) by about 40°, and (d) is a diagram illustrating a state in which the cam wheel 76 normally rotates from the state of (c) by about 40°. FIG. 8 is a diagram of the lock mechanism 46 viewed from the outside, and reverse rotation of the cam wheel 76 is the clockwise direction.

The cam wheel 76 reversely rotates from the basic state illustrated in FIG. 8(*a*) due to action of the motor 94. As illustrated in FIG. 8(*b*), when the cam wheel 76 reversely rotates by about 40°, the second inclined wall 76*d* of the cam wheel. 76 presses the second projection 86*f*. Due to this, the lock lever 86 rotates in the counterclockwise direction, and the spring reception part 86*g* gets over the bending part 100*a* of the spring 100 to be displaced to a predetermined inclined position. Following the rotation of the lock lever 86, the sub-lock lever 82 is driven by the outer knob 86*c* to rotate in the clockwise direction, the open link 80 is driven by the inner knob 86*i* to rotate in the counterclockwise direction, and the auxiliary lever 88 is driven by the push-out part 86*h* (refer to FIG. 5) to rotate in the counterclockwise direction. Due to this, the sub-lock lever 82 and the open link 80 are caused to be at unlocked positions, and the circular arc projection 88*b* of the auxiliary lever 88 is displaced to a position close to the sleeve 77*a*.

As illustrated in FIG. 8(*c*), when the cam wheel 76 normally rotates by about 40° from the state of FIG. 8(*b*)), the cam wheel 76 returns to the position illustrated in FIG. 8(*a*). However, the spring reception part 86*g* is held by the bending part 100*a*, so that the lock lever 86, the sub-lock lever 82, and the open link 80 maintain the attitudes illustrated in FIG. 8(*b*). Due to this, the lock mechanism 46 is caused to be in the unlocked state.

At this point, the circular arc projection 88*b* starts to engage with an inner diameter side surface of the holding wall 76*e* of the cam wheel 76, and the auxiliary lever 88 maintains the attitude illustrated in FIG. 8(*b*).

As illustrated in FIG. 8(*d*), when the cam wheel. 76 further normally rotates by about 40° from the state of FIG. 8(*c*), the first inclined wall 77*c* presses the first projection 86*e*. Due to this, the lock lever 86 rotates in the clockwise direction, and the spring reception part 86*g* gets over the bending part 100*a* of the spring 100 to return to the position illustrated in FIG. 8(*a*). Following the rotation of the lock lever 86, the sub-lock lever 82 is driven by the outer knob 86*c* to rotate in the counterclockwise direction, the open link 80 is driven by the cam lever 78 (refer to FIG. 7) to rotate in the clockwise direction, and both of the sub-lock lever 82 and the open link 80 return to the state illustrated in FIG. 8(*a*).

On the other hand, the circular arc projection 88*b* engages with the inner diameter side surface of the holding well 76*e* of the cam wheel 76, so that the auxiliary lever 88 maintains the attitude illustrated in (d). When the cam wheel 76 further normally rotates, an end part on a counterclockwise side of the circular arc projection 88*b* abuts on a closed surface on the counterclockwise side of the holding wall 76*e* to restrict rotation. Due to this, the cam wheel 76 can be prevented from excessively rotating. Thereafter, when the cam wheel 76 reversely rotates to the position illustrated in FIG. 8(*a*), engagement between the circular arc projection 88*b* and the holding wall 76*e* is released, so that the auxiliary lever 88 rotates in the clockwise direction by elastic force of the spring 88*c* to return to the position illustrated in FIG. 8(*a*). In this way, the lock mechanism 46 returns to a basic attitude illustrated in FIG. 8(*a*) as a whole. As described above, in the door latch device 10, engagement of the latch mechanism 44 can be released, and the locked state and the unlocked state of the lock mechanism 46 can be switched by the single motor 94.

Returning to FIG. 3, the electric components of the door latch device 10 include a latch position switch 102 that detects a rotation state of the latch 12, a key lever position switch 104 that detects a rotation state of the sub-key lever 92, and a first lock position switch 106 and a second lock position switch 108 that detect a rotation state of the sub-lock lever 82 via the arm 98 in addition to the motor 94 described above.

The motor 94, the key lever position switch 104, the first lock position switch 106, and the second lock position switch 108 are collectively disposed in the electric component region 42, but the latch position switch 102 is connected to two terminals 110*a* and 110*b* extending from the electric component region 42 so as to be disposed in the vicinity of the latch 12. The terminals 110*a* and 110*b* are held by a plate 112.

Figure 9:
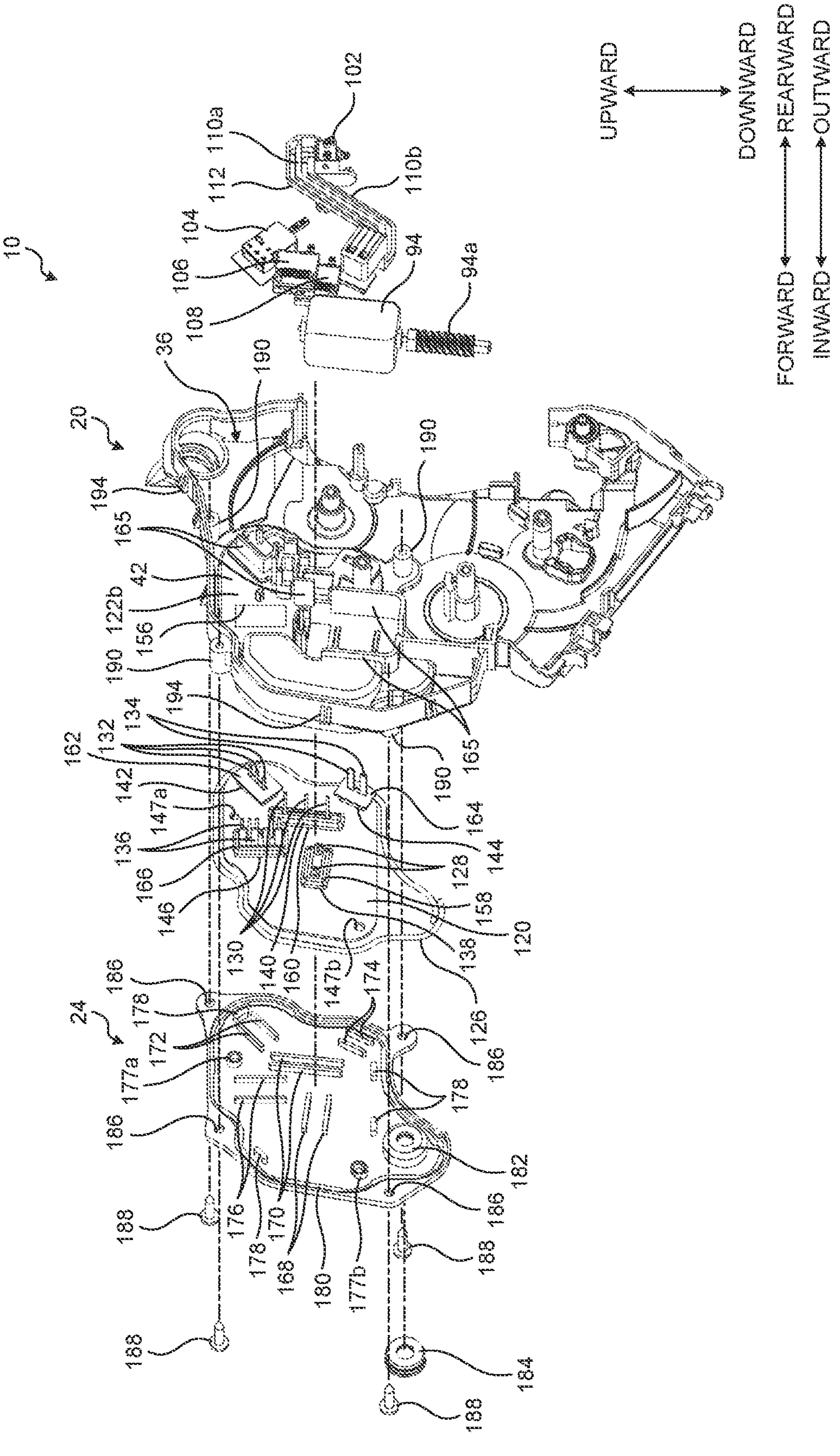
FIG. 9 is an exploded perspective view of electric components, components that house the electric components, and the like viewed from obliquely forward outside.
Figure 10:
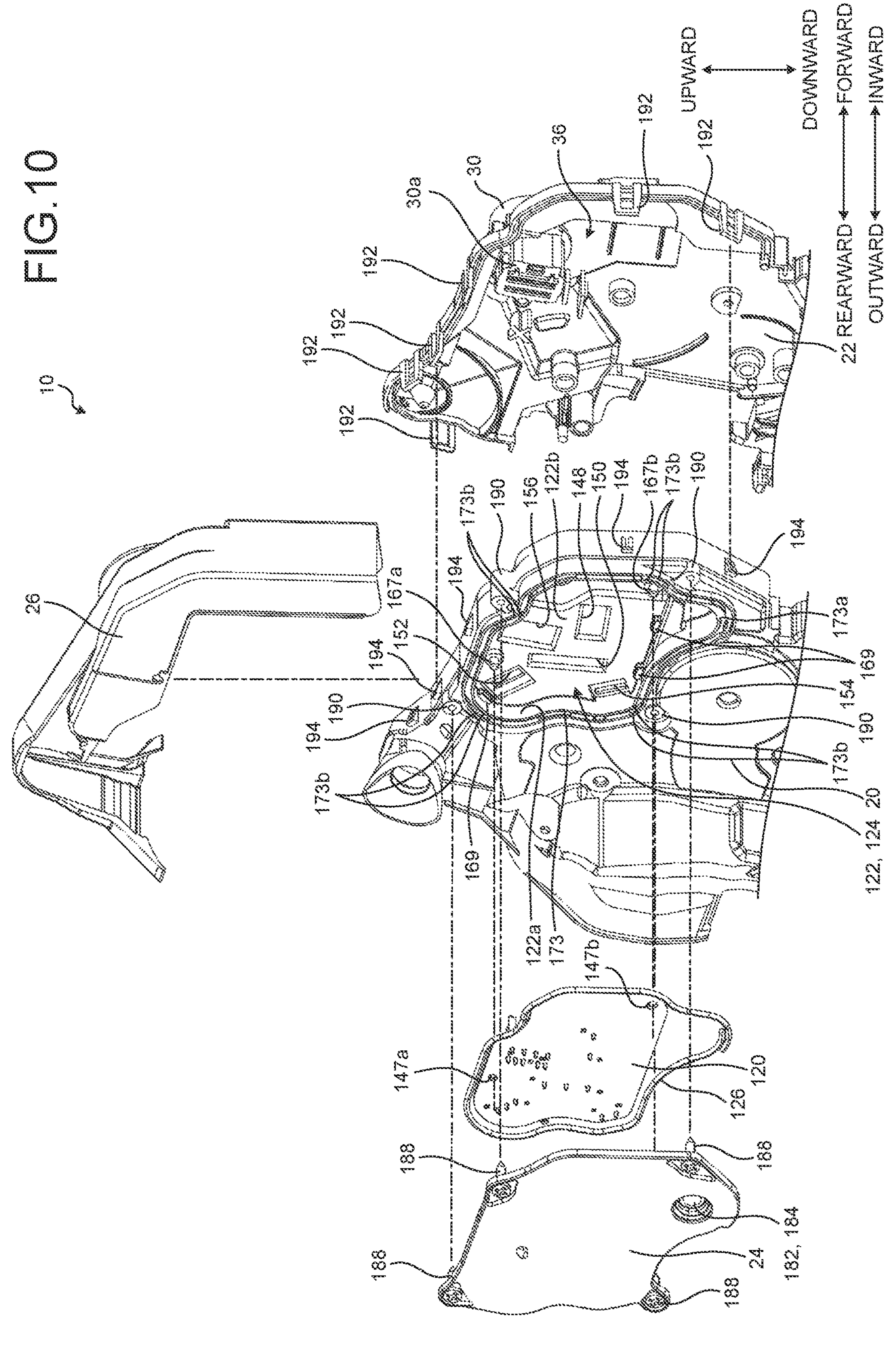
FIG. 10 is an exploded perspective view of electric components, components that house the electric components, and the like viewed from obliquely forward inside.

FIG. 9 is an exploded perspective view of the electric components, components that house the electric components, and the like viewed from obliquely forward outside, and FIG. 10 is an exploded perspective view of the electric components, the components that house the electric components, and the like viewed from obliquely forward inside.

As illustrated in FIG. 9 and FIG. 10, the door latch device 10 includes a circuit board 120 that controls the motor 94. The number of motors controlled by the circuit board 120 may be plural. At an upper part of an outer surface of the case 20, a recessed part 122 is formed in a region corresponding to a back side of the electric component region 42. An outer surface of the recessed part 122 is covered by the second cover 24 described above to form a second housing space 124. The circuit board. 120 is housed in the second housing space 124. As described above, the first housing space 36 is partitioned into the mechanism region 40 in which the machine mechanism 38 is disposed, and the electric component region 42 as a remaining region thereof. Thus, the second housing space 124 is disposed on the back side of the electric component region 42 across the case 20. Due to this, the electric components and the like are disposed in a concentrated manner, and a conductive material can be shortened. The electric component region 42 occupies the forward upper part as described above, so that the circuit board 120 disposed on the recessed part 122 of the second housing space 124 is also disposed on the forward upper part based on orientation of the vehicle. The striker entry groove 14 into which waterdrops may penetrate is disposed rearward, so that waterdrops are prevented from reaching the second housing space 124 and the circuit board 120 therein. An external waterproof seal 126 is disposed between an edge of the recessed part 122 and the second cover 24 in the case 20, and the second housing space 124 is waterproofed against the outside. The external waterproof seal 126 is obtained by cutting a string-like sealing material by a predetermined length, and a dedicated molding is not required. The external waterproof seal 126 is disposed such that lower ends thereof are slightly overlapped with each other.

The circuit board 120 includes pins 128, 130, 132, 134, and 136 (hereinafter, also representatively referred to as pins P) erected toward the outside, pin holders 138, 140, 142, 144, and 146 (hereinafter, also representatively referred to as pin holders H) supporting the pins with respect to the circuit board 120 by covering the periphery of bases of the pins P and two positioning holes 147*a* and 147*b*. The pin holder H has appropriate strength, and can presses an internal waterproof seal B (described later). The pin holder H has appropriate elasticity, and exhibits sealing action for the pin P to be inserted. The pin holder H is made of resin, for example, a molding made of polyacetal.

The two pins 128 are connected to the motor 94. The three pins 130 are connected to the first lock position switch 106 and the second lock position switch 108. The three pins 132 are connected to the key lever position switch 104. The two pins 134 are connected to the latch position switch 102 via the terminals 110*a* and 110*b* The several pins 136 project inward from a hole of a terminal wall 30*a* of the first cover 22 to be part of the coupler 30. In other words, the coupler 30 includes the terminal wall 30*a* disposed on the first cover 22, and the pins 136 that are erected from the circuit board 120, pass through a pin hole 156 (described later), and project from the hole of the terminal wall 30*a*. The pin P is soldered on a back surface of the circuit board 120.

The pin holder 138 holds the two pins 128, the pin holder 140 holds the three pins 130 in series, the pin holder 142 holds the Three pins 132 in series, the pin holder 144 holds the two pins 134, and the pin holder 146 holds the several pins 136 in two columns.

The positioning hole 147*a* and the positioning hole 147*b* are disposed at positions distant from each other. The positioning hole 147*a* is a round hole, the positioning hole 147*b* is a long hole directed to the positioning hole 147*a*, and a manufacturing error of positioning pins 167*a* and 167*b* (described later) is allowed. The circuit board 120 further includes a CPU, a memory, resistance, a capacitor, and the like (not illustrated). The circuit board 120 has an irregular shape substantially along the second housing space 124.

Pin holes 148, 150, 152, 154, and 156 (hereinafter, also representatively referred to as pin holes A) are formed on a bottom plate 122*b* of the recessed part 122 in the case 20. The pin hole A establishes communication between the first housing space 36 and the second housing space 124. The pins 128, 130, 132, 134, and 136 respectively project from the pin holes 148, 150, 152, 154, and 156 in order toward the first housing space 36, and are inserted into pin connection holes disposed on the respective electric components to be electrically connected. Each of the electric components is held by a holding wall 165 disposed on the outer surface of the case 20. Between outer peripheries of the pin holders 138, 140, 142, 144, and 146 and the pin holes 148, 150, 152, 154, and 156, rectangular internal waterproof seals 158, 160, 162, 164, and 166 having a ring shape (hereinafter, also representatively referred to as internal waterproof seals B) are disposed in order. The internal waterproof seal B waterproofs a space between the first housing space 36 and the second housing space 124. The second housing space 124 is waterproofed by the external waterproof seal 126 and the internal waterproof seal B, and suitable for housing the circuit board 120. The internal waterproof seal preferably has a rectangular ring shape corresponding to the corresponding pin hole A, but parts of a non-ring-shaped body may be overlapped to be used like the external waterproof seal 126 depending on a condition. The circuit board 120 is disposed on an upper part than the striker entry groove 14 (refer to FIG. 3). Specifically, a lower part of the circuit board 120 has a horizontal linear shape, and this portion is disposed on an upper part than an upper end of the striker entry groove 14. Even if the external waterproof seal 126 and the internal waterproof seal. 13 are not disposed, waterdrops entered through the striker entry groove 14 are prevented from reaching the circuit board 120.

Two positioning pins 167*a* and 167*b*, and a plurality of inner circuit board supporters (first circuit board supporters) 169 are further formed on the bottom plate 122*b*. The positioning pins 167*a* and 167*b* are inserted into the positioning holes 147*a* and 147*b*, and the circuit board 120 is positioned. The inner circuit board supporter 169 is disposed at a position along the periphery of the circuit board 120, and abuts on an inner surface of the circuit board 120.

A seal groove 173 is formed along an outer circumference of a surrounding wall 122*a* surrounding the recessed part 122. The external waterproof seal 126 is disposed on the seal groove 173. An overlap groove 173*a* for causing lower ends of the external waterproof seal 126 to be overlapped and disposed is formed in the seal groove 173. Projection pairs 173*b* projecting from both sides in an opposed manner are formed at a plurality of points including a bending point in the seal groove 173. The projection pair 173*b* is a stopper for the external waterproof seal 126. A space between the recessed part 122 and the second cover 24 are entirely waterproofed by the external waterproof seal 126.

Pairs of support projections 168, 170, 172, 174, and 176 (hereinafter, also representatively referred to as support projections C) are formed on an inner surface of the second cover 24. The support projections 168, 170, 172, 174, and 176 are disposed at positions opposed to the pin holders 138, 140, 142, 144, and 146 in order across the circuit board 120. The support projection C supports a back side of an abutting part of the pin holder H in the circuit board 120. The support projection C and a leg part Hd (described later) are disposed on both sides across the pin P in a longitudinal direction of the pin holder H.

On the inner surface of the second cover 24, two positioning posts 177*a* and 177*b*, a plurality of outer circuit board supporters (second circuit board supporters) 178, a seal pressing projection 180, and an osmosis membrane holder 182 are further formed A round hole is formed on the positioning post 177*a*, and a long hole directed to the positioning post 177*a* is formed on the positioning post 177*b*. The positioning pins 167*a* and 167*b* passed through the positioning holes 147*a* and 147*b* are inserted into respective holes of the positioning posts 177*a* and 177*b*, and the second cover 24 is positioned.

The outer circuit board supporter 178 is disposed at a position along the periphery of the circuit board 120 and a position opposed to the inner circuit board supporter 169 via the circuit board 120, and sandwiches and holds the circuit board 120 between itself and the inner circuit board supporter 169. The inner circuit board supporter 169 and the outer circuit board supporter 178 are disposed to be opposed to each other, and to have the same cross-sectional shape and the same orientation.

The seal pressing projection 180 is a narrow projection having a substantially ring shape along the seal groove 173, and presses an outer surface of the external waterproof seal 126. The external waterproof seal 126 exhibits sealing action by being pressed to be sealed by the seal pressing projection 180.

The osmosis membrane holder 182 is a cylindrical body projecting outward, and has a hole 182*a* at a distal end thereof. An osmosis membrane filter 184 is attached to the osmosis membrane holder 182 from inside. The osmosis membrane filter 184 can prevent passage of waterdrops and cause water vapor to pass through the hole 182*a*, and prevents the second housing space 124 from being caused to be in a high humidity state. The osmosis membrane holder 182 and the osmosis membrane filter 184 are disposed in a space under the circuit board 120 in the second housing space 124. The osmosis membrane holder 182 is disposed in a range surrounded by an abutting part of the external waterproof seal 126 on the second cover 24.

A plurality of screw holes 186 are disposed on the periphery of the second cover 24, and when a screw 188 passed through the screw hole 186 is screwed to a screw post 190 disposed on the case 20, the second cover 24 is fixed to the case 20.

A plurality of hooks 192 are disposed on the periphery of the first cover 22, and when the hook 192 engages with a pawl 194 disposed on the case 20, the first cover 22 is fixed to the case 20. After the first cover 22 and the second cover 24 are attached to the case 20, the waterproof cover 26 is attached thereto from above. With the waterproof cover 26, even if the external waterproof seal 126 and the internal waterproof seal B are not disposed, waterdrops from above can be fairly prevented from reaching the circuit board 120 within the second housing space 124 covered by the second cover 24.

The first housing space 36 formed between the case 20 and the first cover 22 is not completely waterproofed, and has what is called a dripproof structure. This is because that the dripproof structure is sufficient for each component housed in the first housing space 36. On the other hand, as described above, the second housing space 124 has a waterproof structure due to the external waterproof seal 126 and the internal waterproof seal B because precision electronic component and the like are mounted on the circuit board 120.

Next, the following further describes a structure for detecting a position of the sub-lock lever (operation detection target) 82 by the first lock position switch (first position switch) 106 and the second lock position switch (second position switch) 108. The three pins 130 described above are distinguished from each other as a first signal pin 130*a*, a second signal pin 130*b*, and a common pin 130*c* (refer to FIG. 13) hereinafter. As described above, each of the first signal pin 130*a*, the second signal pin 130*b*, and the common pin 130*c* is erected from the circuit board 120. The first switch 106 and the second switch. 108 are stacked, so that the first signal pin 130*a*, the second signal pin 130*b*, and the common pin 130*c* are close to each other, and can be collectively disposed on the circuit board 120, which is preferable on a print pattern layout. These pins may have a form such that, for example, an end part of a member such as the terminals 110*a* and 110*b* (refer to FIG. 3) is erected from the plate 112 or the housing.

Hereinafter, the first lock position switch 106 and the second lock position switch 108 are simply referred to as the first switch 106 and the second switch 108. As described later, the first switch 106 and the second switch 108 are stacked and disposed at positions shifted from each other in the X-direction (refer to FIG. 15).

Figure 11:
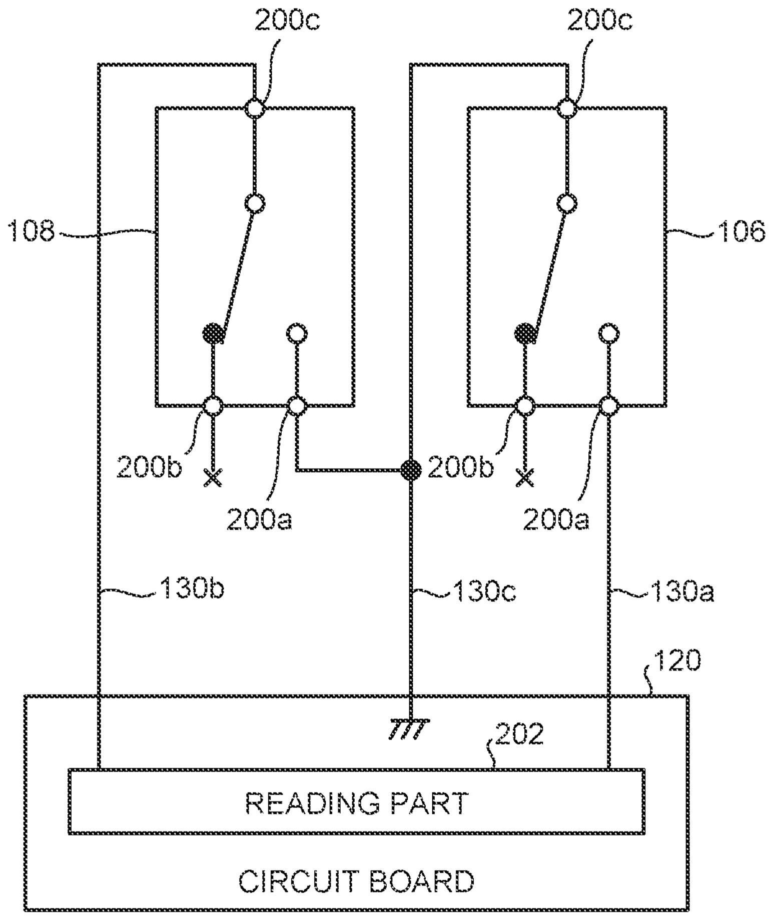
FIG. 11 is a circuit diagram to which a first switch and a second switch are applied in the door latch device.

FIG. 11 is a circuit diagram of the door latch device 10 to which the first switch 106 and the second switch 108 are applied. The first switch 106 and the second switch 108 have the same structure, and each include a first contact hole 200*a* connected to a normally open contact, a second contact hole 200*b* connected to a normally closed contact (that is, a reverse format of the first contact hole 200*a*), and a common contact hole 200*c* connected to a common contact.

Figure 14:
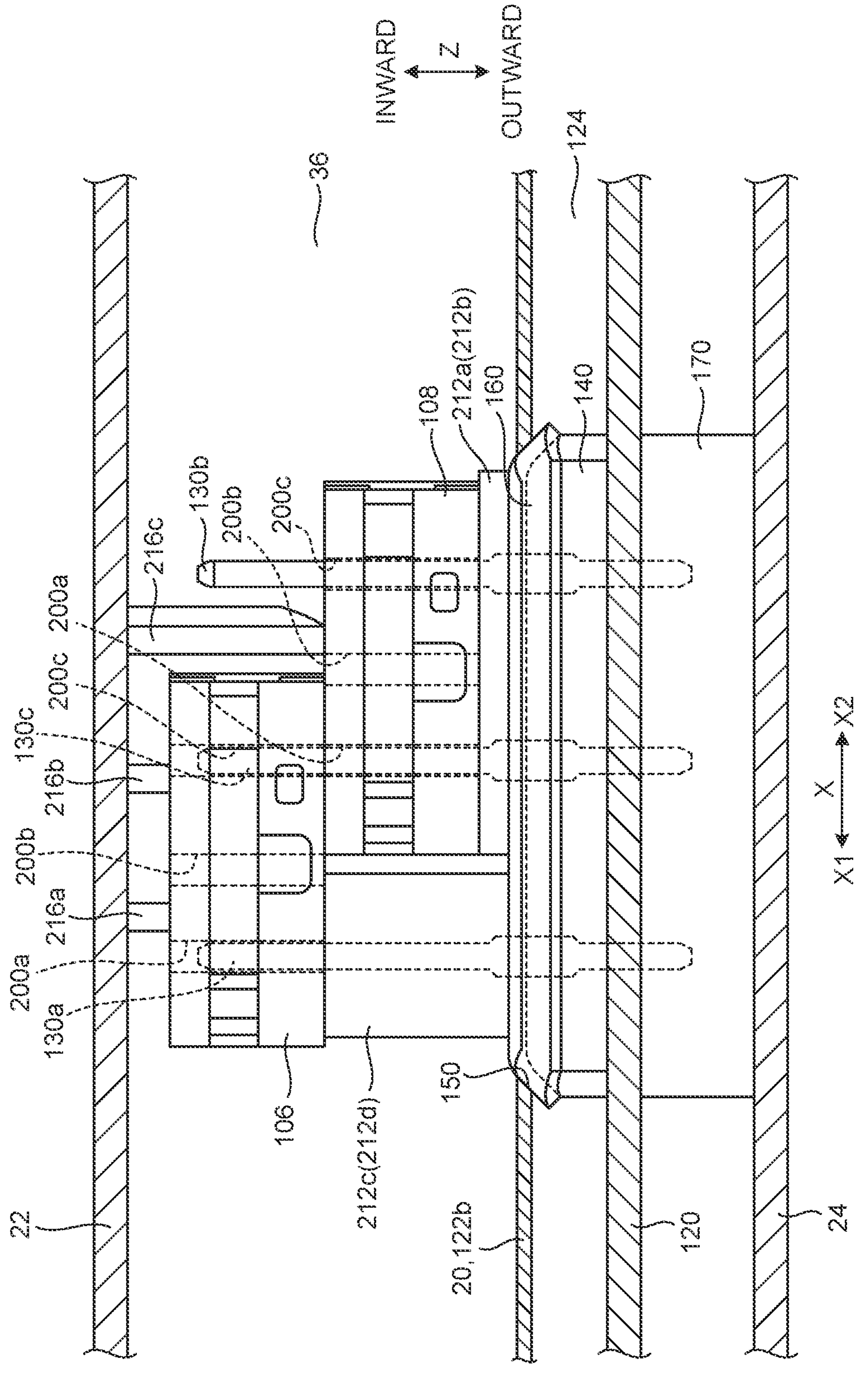
FIG. 14 is a partial cross-sectional side view of the first switch and the second switch a state of being stacked and assembled, and the periphery thereof.

The first signal pin 130*a* is inserted into the first contact hole 200*a* of the fir switch 106 to be electrically conducted (refer to FIG. 14). The second signal pin 130*b* is inserted into the common contact hole 200*c* of the second switch 108 to be electrically conducted (refer to FIG. 14). The common pin 130*c* is inserted into the common contact hole 200*c* of the first switch 106 and the first contact hole 200*a* of the second switch 108 to be electrically conducted (refer to FIG. 14). Three pins, that is, the first signal pin 130*a*, the second signal pin 130*b*, and the common pin 130*c* are enough for the pins P related to the first switch 106 and the second switch 108. In this case, the second contact hole 200*b* is not used in any of the first switch 106 and the second switch 108.

Each of the first signal pin 130*a*, the second signal pin 130*b*, and the common pin 130*c* is soldered to the circuit board 120. Signals related to the first signal pin 130*a* and the second signal pin 130*b* are independently read by a reading part 202 on the circuit board 120. The signals read by the reading part 202 are supplied to a CPU (not illustrated), and used for control determination.

As described later, the first switch 106 and the second switch 108 perform a switch operation at the same timing due to an operation of the sub-lock lever 82 as the operation detection target. Thus, the reading part 202 can acquire an operation detection signal of the sub-lock lever 82 twice, and even in a case in which any one of the first switch 106 and the second switch 108 breaks down, control processing can be continued based on a detection signal obtained by the other of the first switch 106 and the second switch 108 in a normal state.

In this case, the CPU that performs control monitors the detection signal of the first switch 106 and the detection signal of the second switch 108, and if any one of the detection signals is changed, control processing based on the detection signal may be performed. In a case in which the detection signal of the first switch 106 is not synchronized with the detection signal of the second switch 108, it may be determined that one of the first switch 106 and the second switch 108 the detection signal of which is not changed breaks down, and some kind of warning processing may be performed.

Figure 12:
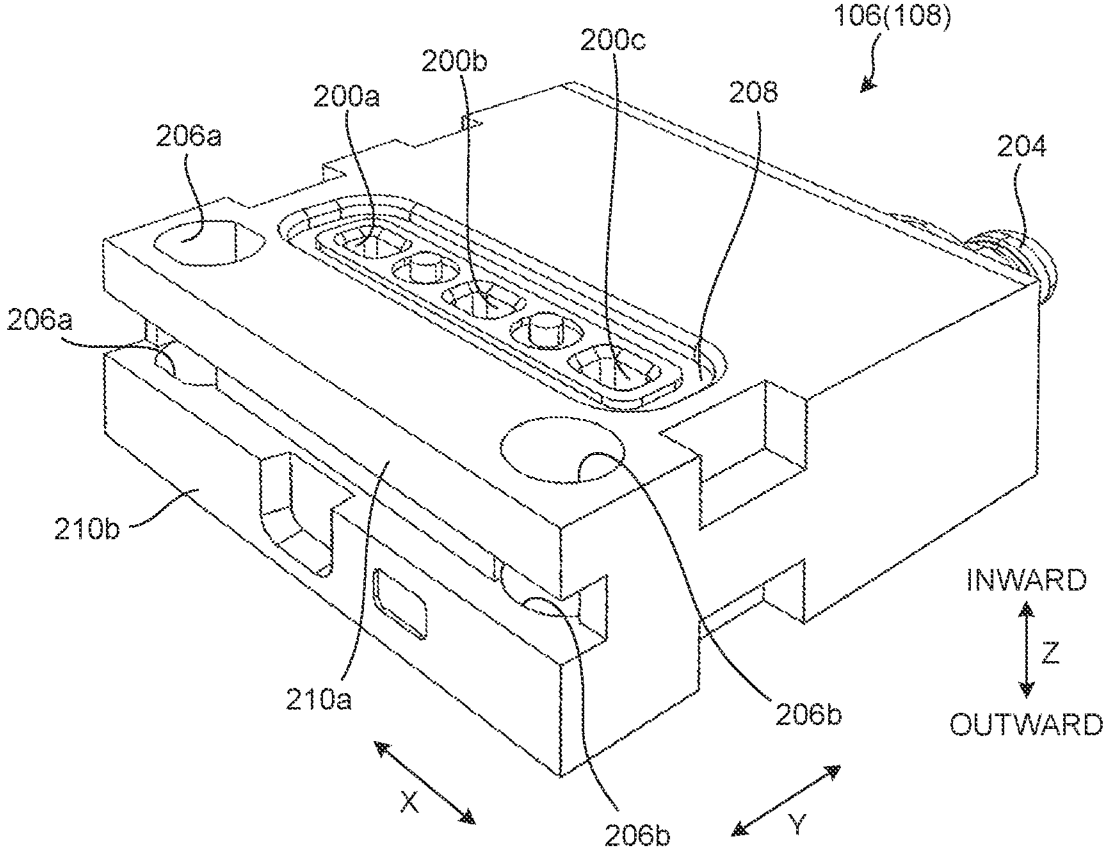
FIG. 12 is a perspective view of the first switch.

FIG. 12 is a perspective view of the first switch 106. As described above, the second switch 108 also has the same structure. As illustrated in FIG. 12, the first switch 106 has a slightly flat boy shape along the XY-plane formed by the X-direction and the Y-direction or to each other, and a dimension in the Z-direction orthogonal to the X- and Y-directions is slightly small. In this case, the Z-direction is an inward/outward direction. The first switch 106 includes the first contact hole 200*a*, the second contact hole 200*b*, and the common contact hole 200*c* described above, and further includes an actuator 204 and Positioning holes 206*a* and 206*b*. The first contact hole 200*a*, the second contact hole 200*b*, and the common contact hole 200*c* are disposed side by side in the X-direction, pass through the first switch 106 in the Z-direction, and open on a bottom part of a recessed part 208. A surface opposite to a surface on which the actuator 204 is disposed has a stepped shape in which an upper stage part 210*a* and a lower stage part 210*b* project. The positioning holes 206*a* and 206*b* pass through the upper stage part 210*a* and the lower stage part 210*b* in the Z-direction. The positioning holes 206*a* and 206*b* are disposed in the vicinity of both ends in the X-direction.

The actuator 204 is disposed on a surface of a main body part, and moves forward and backward in the Y-direction. At the time when the first switch 106 does not act, the actuator 204 is in a projecting state, the first contact hole 200*a* and the common contact hole 200*c* are opened, and the second contact hole 200*b* and the common contact hole 200*c* are closed. When the actuator 204 is pushed against elastic force by external force, the first switch 106 is caused to be in an acting state, the first contact hole 200*a* and the common contact hole 200*c* are closed, and the second contact hole 200*b* and the common contact hole 200*c* are opened.

Figure 13:
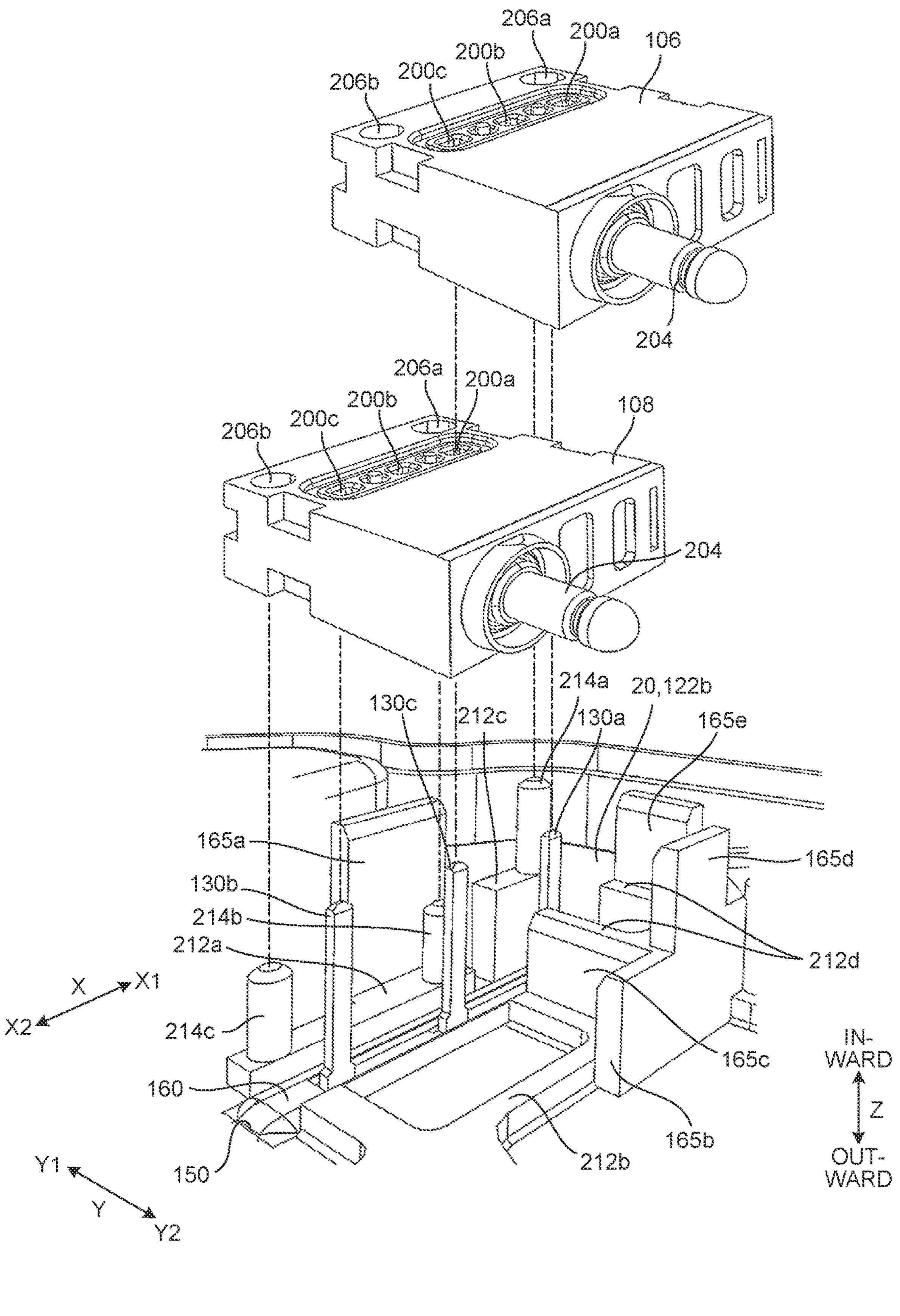
FIG. 13 is an exploded perspective view of the first switch, the second switch, and a case.

FIG. 13 is an exploded perspective view of the first switch 106, the second switch 108, and the case 20. The case 20 in a range illustrated in FIG. 13 corresponds to the bottom plate 122*b* described above, that is, a portion at which the pin hole 150 is disposed and the periphery thereof. As illustrated in FIG. 13, holding walls 165*a*, 165*h*, 165*c*, 165*d*, and 165*e*, mounts 212*a*, 212*b*, 212*c*, and 212*d*, and positioning pins 214*a*, 214*h*, and 214*c* are disposed in the case 20.

The mounts 212*a* and 212*b* are low bulging parts on which the second switch 108 is placed. The mount 212*a* is disposed on one side in the Y-direction (Y1-direction in FIG. 13), and the mount 212*b* is disposed on the other side (Y2-direction in FIG. 13) across the pin hole 150. The mount 212*a* is formed in the X-direction while being in contact with the pin hole 150. The mount 212*b* has a "U" shape. The mount 212*a* and the mount 212*b* support substantially the entire circumference of a lower surface of the second switch 108.

The mounts 212*c* and 212*d* are slightly high bulging parts on which the first switch 106 is placed. The mount 212*c* is disposed in the Y1-direction, and the mount. 212*d* is disposed in the Y2-direction across the pin hole 150. The mount 212*c* is formed to be in contact with the pin hole 150. The mount 212*d* has a "U" shape. The mount 212*c* and the mount 212*d* support a substantially half of a lower surface of the first switch 106 in the X-direction (X1-direction in FIG. 13). The mount 212*c* and the mount 212*d* are disposed on the X1-direction side as compared with the mount 212*a* and the mount 212*b*, and a dimension in the X-direction is substantially half of the mount 212*a* and the mount 212*b*, respectively. Dimensional differences in the Z-direction between the mount 212*c* and the mount 212*a*, and between the mount 212*d* and the mount 212*b* are equal to a dimension in the Z-direction of the second switch 108.

The holding wall 165*a* is a slightly high bulging part supporting part of 171-direction surfaces of the first switch 106 and the second switch 108, and disposed on the Y1-direction side as compared with the mount 212*a* The holding wall 165*b* is a bulging part supporting part of a Y2-direction surface of the second switch 108, and connected with the mount 212*d*. The holding wall 162 is a bulging part supporting an X1-direction surface of the second switch 108. The holding wall 165*c* also serves as part of the mount 212*d*. The holding wall 165*d* is a bulging part supporting part of a Y2-direction surface of the first switch 106, and erected from an inner side of the mount 212*d*. The holding wall 165*d* is integrated with the holding wall 165*b*. The holding wall 165*e* is a bulging part supporting an X1-direction surface of the first switch 106, and erected from an inner surface of the mount 812*d*.

The positioning pin 214*a* is inserted into the positioning hole 206*a* of the first switch 106. The positioning pin 214*a* is erected from an inner surface of the mount 212*c*. The positioning pin 214*b* is inserted into the positioning hole 206*a* of the second switch 108. The positioning pin 214*c* is inserted into the positioning hole 206*b* of the second switch 108. The positioning pins 214*b* and 214*c* are erected from an inner surface of the mount 212*a*.

FIG. 14 is a partial cross-sectional side view of the first switch 106 and the second switch 108 in a state of being stacked and assembled, and the periphery thereof. FIG. 14 illustrates the first switch. 106 and the second switch 108 viewed from the Y1-direction (refer to FIG. 13), and the holding walls 165*a* to 165*e* and the like are not illustrated.

As illustrated in FIG. 14, the first switch 106 and the second switch 108 are stacked in the Z-direction without a gap. The first switch 106 and the second switch 108 are disposed to be shifted from each other in the X-direction. Specifically, the first switch 106 is shifted in the X1-direction with respect to the second switch 100, the common contact hole 200*c* of the first switch 106 is matched with the first contact hole 200*a* of the second switch 108 in the X-direction, and the common pin 130*c* is inserted through the common contact hole 200*c* and the first contact hole 200*a* to make continuity therebetween. A substantially half on a distal end side of the first signal pin 130*a* is inserted into the first contact hole 200*a* of the first switch 106, and a substantially half on a base side thereof is exposed. A substantially half on a base side of the second signal pin 130*b* is inserted into the common contact hole 200*c* of the second switch 108, and a substantial y half on a distal end side thereof is exposed. The first switch 106 and the second switch 108 are not shifted from each other in the Y-direction (refer to FIG. 13).

Two slightly low projections 216*a* and 216*b*, and one slightly high projection 216*c* are disposed side by side in the X-direction on the first cover 22. An inner surface of the first switch. 106 is held by the projections 216*a* and 216*b*, and an outer surface thereof is held by the mounts 212*c* and 212*d*, and the second switch. 108. An inner surface of the second switch 108 is held by the first switch 106 and the projection 216*c*, and an outer surface thereof is held by the mounts 212*a* and 212*b*.

Waterproof treatment is performed on the second housing space 124 as a region in which the circuit board 120 is disposed with the internal waterproof seal 160 around the pin hole 150 with respect to the first housing space 36 as a region in which the first switch 106 and the second switch 108 are disposed. The circuit board 120 is sandwiched and held to be stable by the pin holder 140 and the support projection 170. In this case, the bottom plate 122*b* serves as a partition plate that partitions between the first housing space 36 and the second housing space 124.

Figure 15:
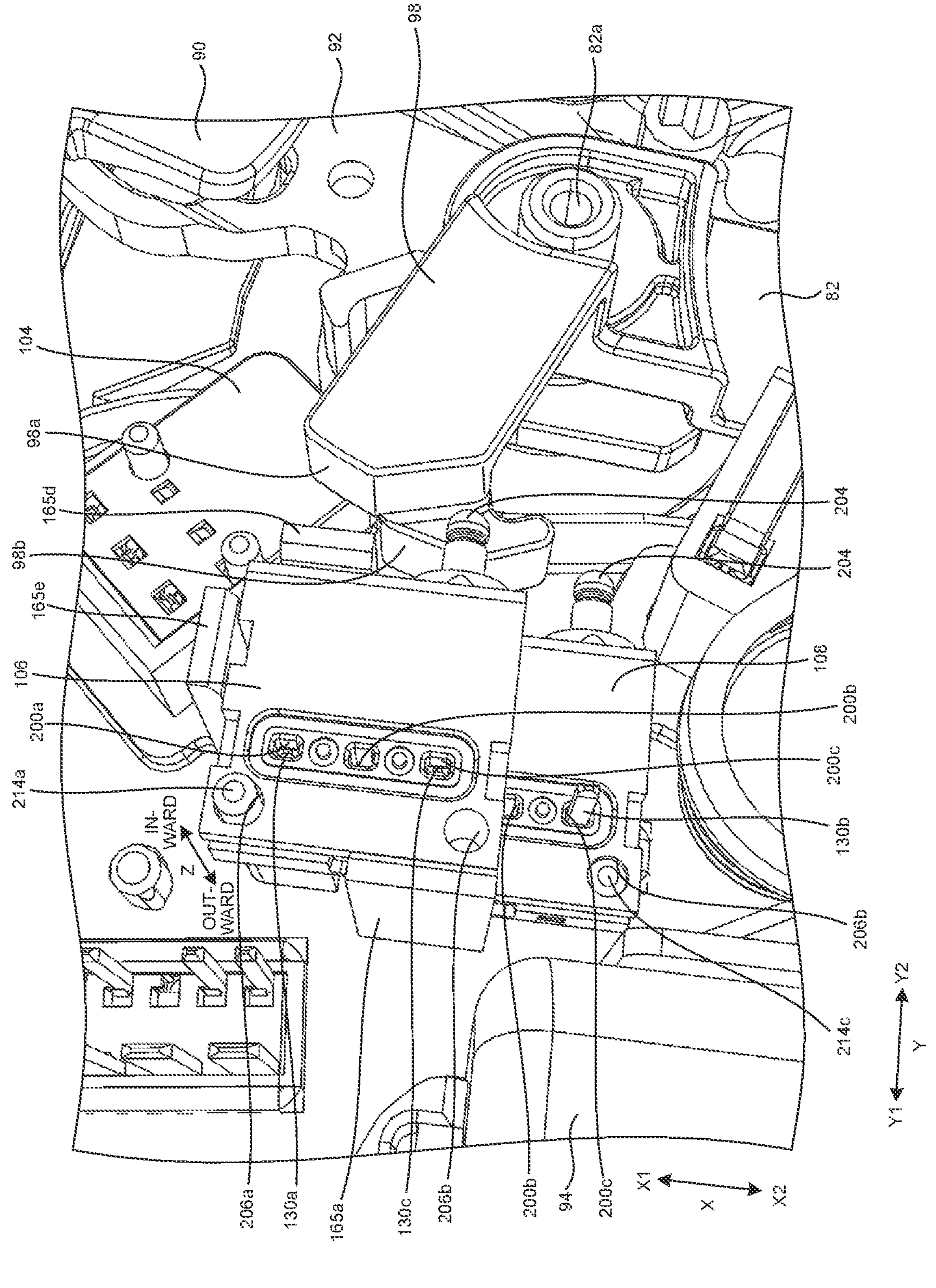
FIG. 15 is a perspective view illustrating the first switch, the second switch, and the periphery thereof inside the door latch device.

FIG. 15 is a perspective view illustrating the first switch 106, the second switch 108, and the periphery thereof inside the door latch device 10 FIG. 15 corresponds to an upper portion of FIG. 3.

As illustrated in FIG. 15, each actuator 204 of the first switch 106 and the second switch 108 projects from the main body part in the Y2-direction. The shaft part 82*a* of the sub-lock lever 82 is present at a position in the Y2-direction from a substantial center of two actuators 204. The shaft part 82*a* is a shaft in the Z-direction.

As described above, the arm 98 projecting from the shaft part 82*a* is disposed on an upper part of the sub-lock lever 82. A first cam 98*a* and a second cam 98*b* are disposed at a distal end of the arm 98. The first cam 98*a* and the second cam 98*b* are shifted from each other in the Z-direction, the first cam 98*a* is disposed on an inner side, and the second cam 98*b* is disposed on an outer side. The first cam 98*a* and the actuator 204 of the first switch 106 are at the same position with respect to the Z-direction. The second cam 98*b* and the actuator 204 of the second switch. 108 are at the same position with respect to the Z-direction.

The first cam 98*a* and the second cam 98*b* are disposed to be shifted from each other in a circumferential direction with respect to the shaft part 82*a*. The arm 98 is appropriately long, so that a shift between the first cam 98*a* and the second can: 98*b* in the circumferential direction can be regarded as a shift on a substantially straight line, and is equal to a shift between the two actuators 204 in the X-direction. The first switch 106 and the second switch 108 are stacked, and a shift amount between the two actuators 204 in the X-direction is small, so that a shift amount between the first cam 98*a* and the second cam 98*b* is also small. Thus, the arm 98 can be set to be relatively narrow.

Figure 16:
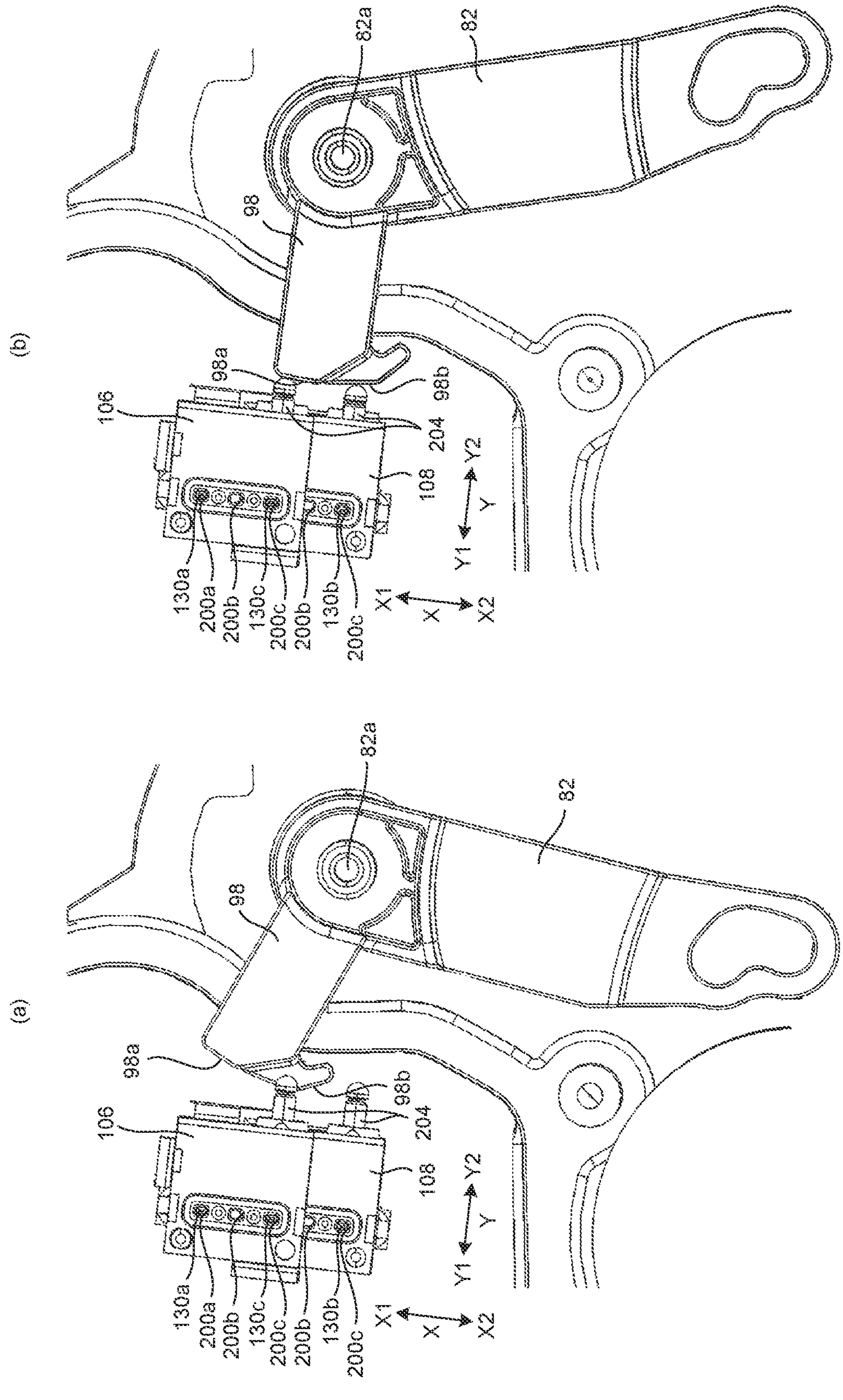
FIG. 16 is a diagram illustrating an operational relation among the first switch, the second switch, and a sub-lock lever, (a) is a diagram illustrating the sub-lock lever in a state of a locked attitude, and (b) is a diagram illustrating the sub-lock lever in a state of an unlocked attitude.

FIG. 16 is a diagram illustrating an operational relation among the first switch 106, the second switch 108, and a sub-lock lever 82, (a) is a diagram illustrating the sub-lock lever 82 in a state of a locked attitude, and (b) is a diagram illustrating the sub-lock lever 82 in a state of an unlocked attitude.

As illustrated in FIG. 16(*a*), when the sub-lock lever 82 is in the locked attitude, the first cam 98*a* is disposed on a side slightly distant from the actuator 204 of the first switch 106 in the X1-direction, and the second cam 98*b* is disposed on a side slightly distant from the actuator 204 of the second switch 108 in the X1-direction. At this point, each of the first switch 106 and the second switch 108 is in a non-acting state, and is in the state illustrated in FIG. 11. That is, each first contact hole 200*a* is opened with respect to the common contact hole 200*c*. The reading part 202 reads that each first contact hole 200*a* is opened with respect to the common contact hole 200*c* from the first signal pin 130*a* and the second signal pin 130*b*.

As illustrated in FIG. 16(*b*), when the sub-lock lever 82 is in the unlocked attitude, the first cam 98*a* and the second cam 98*b* are displaced from the state illustrated in FIG. 16(*a*) in a substantial X2-direction (reverse direction of X1 following the rotation of the sub-lock lever 82. The first cam 98*a* pushes the actuator 204 of the first switch 106 in the Y2-direction, and the second cam 98*b* pushes the actuator 204 of the second switch 108 in the Y2-direction. Due to this, the first switch and the second switch perform a switch operation at the same timing due to the operation of the sub-lock lever 82, and each of the first switch 106 and the second switch 108 is caused to be in the acting state. That is, each first contact hole 200*a* (refer to FIG. 11) is closed with respect to the common contact hole 200*c*. The reading part 202 reads that each first contact hole 200*a* is closed with respect to the common contact hole 200*c* from the first signal pin 130*a* and the second signal pin 130*b*. Thus, the reading part 202 reads the attitude of the sub-lock lever 82 twice, so that the operation thereof can be detected more securely. Even if any one of the first switch. 106 and the second switch 108 breaks down and does not perform the switch operation, predetermined control can be performed based on the switch operation of the other one thereof in a normal state. Additionally, the first switch 106 and the second switch 108 are stacked, so that an occupied area is small.

Figure 17:
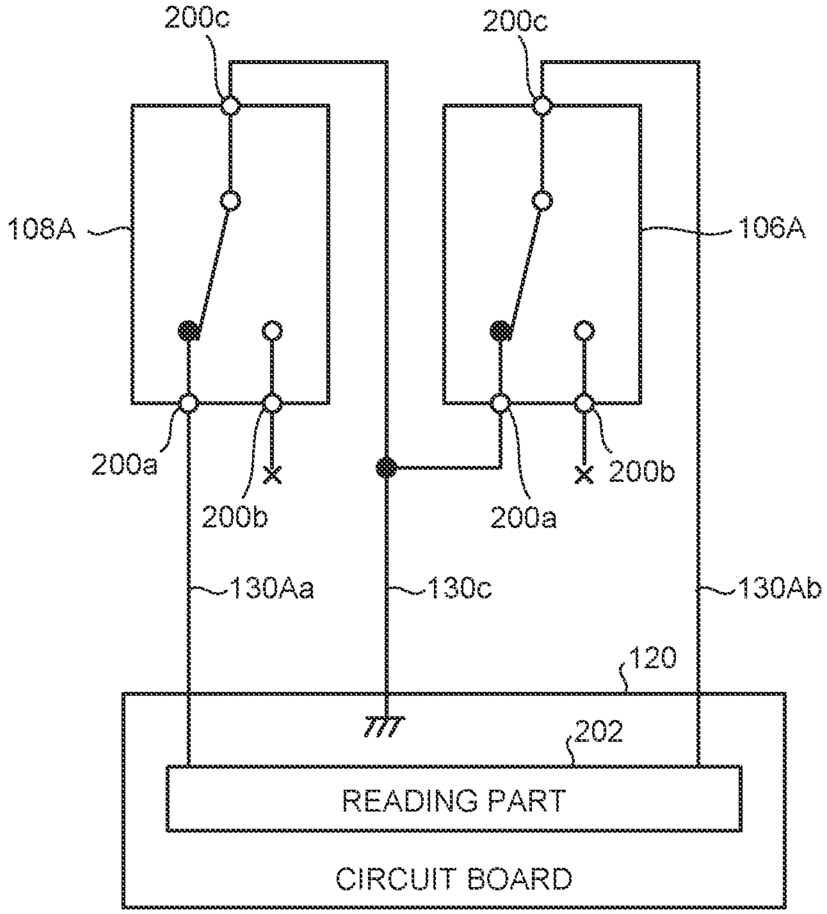
FIG. 17 is a circuit diagram according to a modification to which the first switch and the second switch are applied.

FIG. 17 is a circuit diagram according to a modification to which a second switch 106A and a first switch 108A are applied in place of the first switch 106 and the second switch 108 described above. As is clear from comparison between FIG. 11 and FIG. 17, the former is a normally open circuit, and the latter is a normally closed circuit.

In the first switch 106 and the second switch 108 described above (refer to FIG. 11), the first contact hole 200*a* is a normally open contact and the second contact hole 200*b* is a normally closed contact. In contrast, in the first switch 108A and the second switch 106A, the first contact hole 200*a* is the normally closed contact and the second contact hole 200*b* is the normally open contact Although not illustrated herein, the other configurations of the first switch 108A and the second switch 106A are the same as those of the first switch 106 and the second switch 108. A first signal pin 130Aa in FIG. 17 is the same as the second signal pin 130*b* in FIG. 11, a second signal pin 130Ab is the same as the first signal pin 130*a* in FIG. 11, and only designations thereof are different.

In this case, the first signal pin 130Aa is inserted into the first contact hole 200*a* of the first switch 108A to be electrically conducted. The second signal pin 130Ab is inserted into the common contact hole 200*c* of the second switch 106A to be electrically conducted. The common pin 130*c* is inserted into the common contact hole 200*c* of the first switch 108A and the first contact hole 200*a* of the second switch 106A to be electrically conducted. In this case, the second contact hole 200*b* is not used in any of the first switch 108A and the second switch 106A.

In a case of using such a circuit, when the sub-lock lever 82 is in the locked attitude (refer to FIG. 16(*a*)), each of the first switch 1081 and the second switch 106A is in the non-acting state, and each first contact hole 200*a* is closed with respect to the common contact hole 200*c*. The reading part 202 reads that each first contact hole 200*a* is closed with respect to the common contact hole 200*c* from the first signal pin 130Aa and the second signal pin 130Ab.

When the sub-lock lever 82 is in the unlocked attitude (refer to FIG. 16(*b*)), each of the first switch 108A and the second switch 106A is in the acting state That is, each first contact hole 200*a* is opened with respect to the common contact hole 200*c*. The reading part 202 reads that each first contact hole 200*a* is open with respect to the comm cm contact hole 200*c* from the first signal pin 130Aa and the second signal pin 130Ab. Thus, similarly to the case of the circuit illustrated in FIG. 11, the reading part 202 can detect the attitude of the sub-lock lever 82 twice.

The present invention is not limited to the embodiment described above, and can be freely modified without departing from the gist of the present invention, obviously.

REFERENCE SIGNS LIST

10 Door latch device
12 Latch
14 Striker entry groove
16 Cover plate
18 Body
20 Case
22 First cover
24 Second cover
30 Coulter
32 Key cylinder coupling part
34 Outer lever
36 First housing space
38 Machine mechanism
40 Mechanism region
42 Electric component region
44 Latch mechanism
46 Lock mechanism
52 Ratchet
54 Ratchet holder
58 Anti-panic lever
59 Inner lever
82 Sub-lock lever (operation detection target)
84 Open lever
94 Motor
98 Arm
98*a* First cam
98*b* Second cam
106, 108A First position switch, first switch
108, 106A Second position switch, second switch
120 Circuit board
122 Recessed part
124 Second housing space
126 External waterproof seal
128, 130, 132, 134, 136, P Pin
130*a* First signal pin
130*b* Second signal pin
130*c* Common pin
130Aa First signal pin
130Ab Second signal pin
138, 140, 142, 144, 146, H Pin holder
148, 150, 152, 154, 156, A Pin hole
158, 160, 162, 164, 166, 13 Internal waterproof seal
168, 170, 172, 174, 176, C Support projection
169 Inner circuit board supporter
200*a* First contact hole
200*b* Second contact hole
200*c* Common contact hole
202 Reading part

The invention claimed is:

1. A door latch device comprising:
a first position switch and a second position switch, each of the first position switch and the second position switch including
a first contact hole connected to one of a normally open contact or a normally closed contact,
a second contact hole connected to a contact having a reverse format of the first contact hole, and
a common contact hole connected to a common contact, wherein
the first contact hole, the second contact hole and the common contact hole are arranged on a straight line,
the first position switch and the second position switch are disposed at positions shifted from each other along the straight line and stacked in a piercing direction of the first contact hole, the second contact hole, and the common contact;
a common pin configured to be electrically conducted to the common contact hole of the first position switch and the first contact hole of the second position switch by being inserted therein;
a first signal pin configured to be electrically conducted to the first contact hole of the first position switch by being inserted therein; and
a second signal pin configured to be electrically conducted to the common contact of the second position switch by being inserted therein, wherein
the first position switch and the second position switch are configured to perform a switch operation at a same timing of an operation of a predetermined operation detection target.

2. The door latch device according to claim 1, further comprising a circuit board, wherein
each of the common pin, the first signal pin and the second signal pin is erected from the circuit board.

3. The door latch device according to claim 2, wherein
a space in which the circuit board is disposed and a space in which the first position switch and the second position switch are disposed are partitioned with a partition plate, and
the first signal pin, the second signal pin and the common pin are configured to pierce pin holes formed on the partition plate and project from one of the spaces to another one of the spaces.

4. The door latch device according to claim 3, wherein, in the space in which the circuit board is disposed, waterproof treatment is applied to the space in which the first position switch and the second position switch are disposed, around the pin holes.

5. The door latch device according to claim 1, wherein
the operation detection target includes
a first cam configured to act on an actuator of the first position switch, and
a second cam configured to act on an actuator of the second position switch, and
the first cam and the second cam are shifted from each other in a stacking direction of the first position switch and the second position switch, and are disposed at positions shifted from each other along the straight line.

6. The door latch device according to claim 1, comprising:
a latch mechanism configured to hold a door of a vehicle in a closed state;
an electric release unit configured to release the latch mechanism by power of a motor;
a manual release unit configured to release the latch mechanism by manual operation force; and
a lock mechanism configured to switch between a locked state for disabling a function of the manual release unit and an unlocked state for enabling the same, wherein
the operation detection target is a component whose position is switched depending on whether the lock mechanism is in the locked state or the unlocked state, and
the first position switch and the second position switch are configured to detect whether the operation detection target is in the locked state or the unlocked state.

* * * * *